United States Patent
Gao et al.

(10) Patent No.: US 12,426,077 B2
(45) Date of Patent: Sep. 23, 2025

(54) SYSTEMS AND METHODS FOR DETERMINING AND INDICATING ANTENNA PORTS WITH CONFIGURABLE ANTENNA PORT FIELD IN DCI

(71) Applicant: Telefonaktiebolaget LM Ericsson (publ), Stockholm (SE)

(72) Inventors: Shiwei Gao, Nepean (CA); Yufei Blankenship, Kildeer, IL (US); Sebastian Faxér, Stockholm (SE); Mattias Frenne, Uppsala (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 757 days.

(21) Appl. No.: 17/765,859

(22) PCT Filed: Oct. 5, 2020

(86) PCT No.: PCT/IB2020/059308
§ 371 (c)(1),
(2) Date: Apr. 1, 2022

(87) PCT Pub. No.: WO2021/064705
PCT Pub. Date: Apr. 8, 2021

(65) Prior Publication Data
US 2022/0330254 A1    Oct. 13, 2022

Related U.S. Application Data

(60) Provisional application No. 62/910,724, filed on Oct. 4, 2019.

(51) Int. Cl.
*H04W 72/563*    (2023.01)
*H04L 5/00*    (2006.01)
(Continued)

(52) U.S. Cl.
CPC ......... *H04W 72/563* (2023.01); *H04L 5/0051* (2013.01); *H04W 72/0453* (2013.01); *H04W 72/23* (2023.01)

(58) Field of Classification Search
CPC ............... H04W 72/563; H04W 72/23; H04W 72/0453; H04L 5/0051
(Continued)

(56) References Cited

U.S. PATENT DOCUMENTS

| 2018/0270799 A1* | 9/2018 | Noh ........................ H04L 27/261 |
| 2019/0140806 A1 | 5/2019 | Andersson et al. |
| 2019/0296876 A1* | 9/2019 | Zhang .................... H04L 5/0048 |

FOREIGN PATENT DOCUMENTS

| CN | 104704786 A | 6/2015 |
| CN | 110149184 A | 8/2019 |

(Continued)

OTHER PUBLICATIONS

First Office Action for Chinese Patent Application No. 202080083685.4, mailed Aug. 21, 2023, 8 pages.
(Continued)

*Primary Examiner* — Hermon Asres
(74) *Attorney, Agent, or Firm* — Withrow & Terranova, PLLC

(57) ABSTRACT

Systems and methods are disclosed herein for determining and indicating antenna ports in Downlink Control Information (DCI). In one embodiment, a method performed by a wireless communication device comprises receiving a configuration comprising a Demodulation Reference Signal (DMRS) configuration and an antenna port field configuration for an antenna port field in a Downlink Control Information (DCI) format. The method further comprises receiving a DCI of the DCI format and determining a size of an antenna port field and a DMRS port table for interpreting a
(Continued)

Front-loaded DM-RS for configuration type 1 and type 2. Different CDM groups indicated by different patterns. The figures to the left show a single front-loaded DMRS while to the right shows double DMRS. To enable the DMRS pattern to the right max_length=2 must be enabled by higher layer signaling value comprised in the antenna port field based on the DMRS and antenna port field configurations, the determined DMRS port table being a subset of a master DMRS port table. The method further comprises determining a DMRS port(s) used for a corresponding physical channel based on the size of the antenna port field, the DMRS port table, and/or the value of the antenna port field.

25 Claims, 11 Drawing Sheets

(51) Int. Cl.
    *H04W 72/0453*    (2023.01)
    *H04W 72/23*    (2023.01)

(58) Field of Classification Search
    USPC .......................................................... 370/329
    See application file for complete search history.

(56) References Cited

FOREIGN PATENT DOCUMENTS

| | | | |
|---|---|---|---|
| WO | 2018174665 | A1 | 9/2018 |
| WO | 2018231001 | A1 | 12/2018 |
| WO | 2019027151 | A1 | 2/2019 |

OTHER PUBLICATIONS

Intention to Grant for European Patent Application No. 20793159.3, mailed Apr. 6, 2023, 8 pages.
Examination Report for Indian Patent Application No. 202247024967, mailed Sep. 22, 2022, 7 pages.
Author Unknown, "Technical Specification Group Radio Access Network; NR; Multiplexing and channel coding (Release 15)," Technical Specification 38.212, Version 15.6.0, Jun. 2019, 3GPP Organizational Partners, 101 pages.
LG Electronics, "R1-1800368: Remaining issues on DMRS location and DMRS table configuration," 3GPP TSG RAN WG1 Meeting AH 1801, Jan. 22-26, 2018, Vancouver, Canada, 7 pages.
Qualcomm Incorporated, "R1-1807356: Considerations on new DCI format," 3GPP TSG-RAN WG1 #93, May 21-25, 2018, Busan, Korea, 6 pages.
Qualcomm Incorporated, "R1-1907289: Multi-TRP Enhancements," 3GPP TSG-RAN WG1 Meeting #97, May 13-17, 2019, Reno, Nevada, 25 pages.
ZTE, "R1-1908235: On PDCCH enhancements for NR URLLC," 3GPP TSG RAN WG1 #98, Aug. 26-30, 2019, Prague, Czech Republic, 18 page.
International Search Report and Written Opinion for International Patent Application No. PCT/IB2020/059308, mailed Feb. 25, 2021, 16 pages.
International Preliminary Report on Patentability for International Patent Application No. PCT/IB2020/059308, mailed Feb. 9, 2022, 20 pages.

* cited by examiner

Front-loaded DM-RS for configuration type 1 and type 2. Different CDM groups indicated by different patterns. The figures to the left show a single front-loaded DMRS while to the right shows double DMRS. To enable the DMRS pattern to the right max_length=2 must be enabled by higher layer signaling An example flowchart of determining and indicating antenna ports for new compact DCI with configurable antenna ports field size

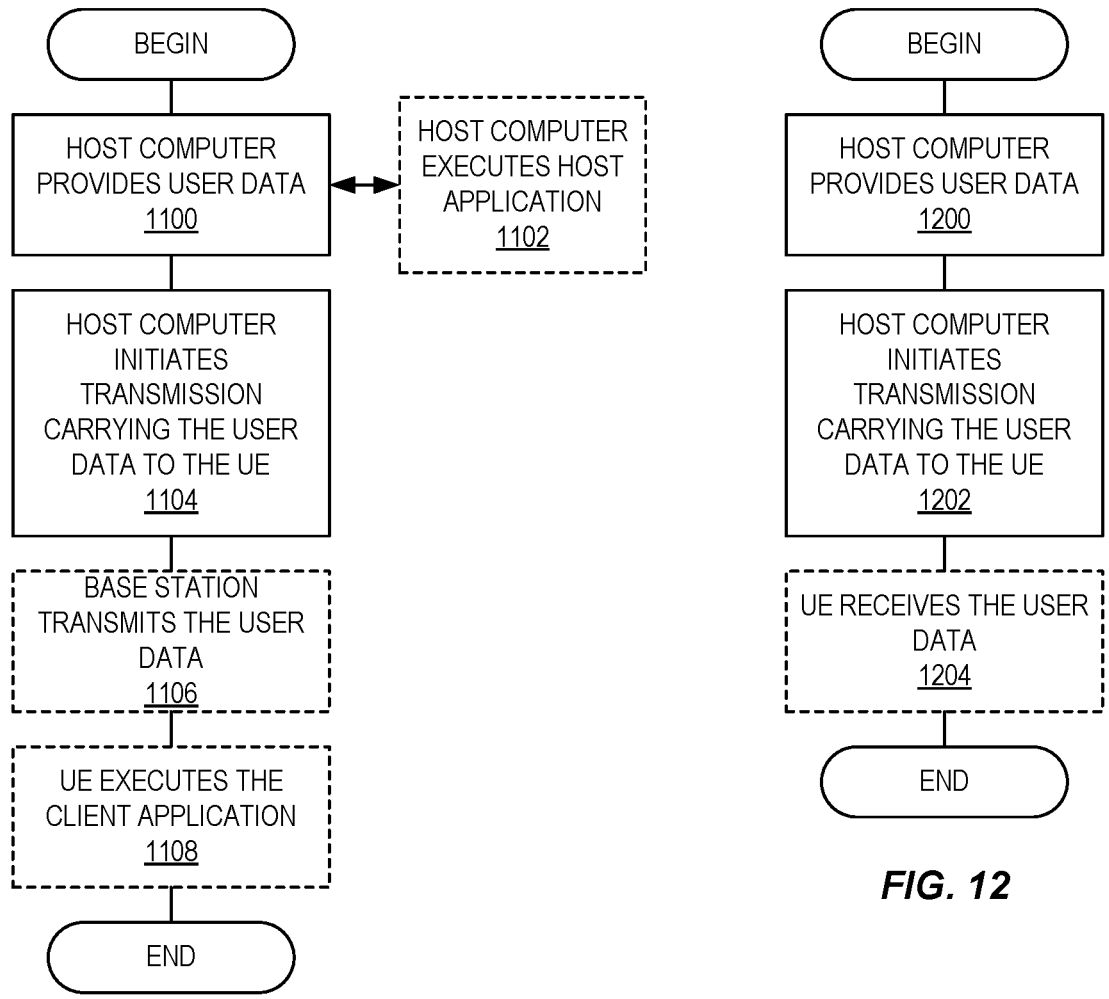

SYSTEMS AND METHODS FOR DETERMINING AND INDICATING ANTENNA PORTS WITH CONFIGURABLE ANTENNA PORT FIELD IN DCI

RELATED APPLICATIONS

This application is a 35 U.S.C. § 371 national phase filing of International Application No. PCT/IB2020/059308, filed Oct. 5, 2020, which claims the benefit of provisional patent application Ser. No. 62/910,724, filed Oct. 4, 2019, the disclosures of which are hereby incorporated herein by reference in its entirety their entireties.

TECHNICAL FIELD

The present disclosure relates to a cellular communications system and, more specifically, to indicating or configuring antenna ports used in a physical layer transmission.

BACKGROUND

Demodulation Reference Signals (DMRS) are used for coherent demodulation of physical layer downlink (DL) data channels, i.e., Physical Downlink Shared Channel (PDSCH), and physical layer uplink (UL) data channels, i.e., Physical Uplink Shared Channel (PUSCH), as well as Physical Layer Downlink Control Channel (PDCCH). The DMRS is confined to Resource Blocks (RBs) carrying the associated physical layer data channel and is mapped on allocated Resource Elements (REs) of the Orthogonal Frequency Division Multiplexing (OFDM) time-frequency grid in New Radio (NR) such that the receiver can efficiently handle time/frequency-selective fading radio channels.

The mapping of DMRS to REs is configurable in both frequency domain and time domain, with two mapping types in the frequency domain (configuration type 1 and type 2) and two mapping types in the time domain (mapping type A and type B) defining the symbol position of the first DMRS within a transmission interval. The DMRS mapping in time domain can further be single-symbol based or double-symbol based where the latter means that DMRS is mapped in pairs of two adjacent OFDM symbols.

FIG. 1 shows the mapping of front-loaded DMRS for configuration type 1 and type 2 with single-symbol and double-symbol DMRS with the first DMRS in the third OFDM symbol (OFDM symbol #2) of a transmission interval of fourteen (14) OFDM symbols. The vertical axis represents frequency in subcarriers starting from subcarrier #0, and the horizontal axis represents time in OFDM symbols starting from OFDM symbol #0 in a single RB. From FIG. 2, it can be observed that type 1 and type 2 differ with respect to the number of supported DMRS Code Division Multiplexing (CDM) groups where type 1 supports two CDM groups and Type 2 supports three CDM groups.

The mapping structure of type 1 is sometimes referred to as a 2-comb structure with two CDM groups defined in the frequency domain by the set of subcarriers {0,2,4, . . . } and {1,3,5, . . . }. The comb mapping structure is a prerequisite for transmissions requiring low Peak-to-Average Power Reduction (PAPR)/Cubic Metric (CM) and is thus used in conjunction with Discrete Fourier Transformation-Spread-OFDM (DFT-S-OFDM), also referred to as transform precoding. In contrast, in Cyclic Prefix OFDM (CP-OFDM) in which transform precoding is disabled, both type 1 and type 2 mapping are supported.

A DMRS antenna port is mapped to the REs within one CDM group only. For a single front-loaded DMRS symbol, two antenna ports can be mapped to each CDM group whereas, for two front-loaded DMRS symbols, four antenna ports can be mapped to each CDM group. Hence, the maximum number of DMRS ports for type 1 is either four (with a single front-loaded symbol) or eight (with two front-loaded symbols) and for type 2 it is either six or twelve. An Orthogonal Cover Code (OCC) of length 2 ([+1,+1],[+1,−1]) is used to separate antenna ports mapped on the same REs within a CDM group. The OCC is applied in the frequency domain as well as in the time domain when two front-loaded DMRS symbols are configured.

Table 1 and Table 2 below show the PDSCH DMRS port to CDM group mapping for configuration type 1 and type 2, respectively. For PDSCH DMRS Type 1, ports 1000, 1001, 1004, and 1005 are in CDM group $\lambda=0$ and ports 1002, 1003, 1006, and 1007 are in CDM group $\lambda=1$. For PDSCH DMRS Type 2, ports 1000, 1001, 1006, and 1007 are in CDM group $\lambda=0$, ports 1002, 1003, 1008, and 1009 are in CDM group $\lambda=1$, and ports 1004, 1005, 1010, and 1011 are in CDM group $\lambda=2$.

TABLE 1

PDSCH DMRS mapping parameters for configuration type 1.

| Port p | CDM group λ | Number of front-loaded symbols |
|---|---|---|
| 1000 | 0 | 1 |
| 1001 | 0 | 1 |
| 1002 | 1 | 1 |
| 1003 | 1 | 1 |
| 1004 | 0 | 2 |
| 1005 | 0 | 2 |
| 1006 | 1 | 2 |
| 1007 | 1 | 2 |

TABLE 2

PDSCH DMRS mapping parameters for configuration type 2.

| Port p | CDM group λ | Number of front-loaded symbols |
|---|---|---|
| 1000 | 0 | 1 |
| 1001 | 0 | 1 |
| 1002 | 1 | 1 |
| 1003 | 1 | 1 |
| 1004 | 2 | 1 |
| 1005 | 2 | 1 |
| 1006 | 0 | 2 |
| 1007 | 0 | 2 |
| 1008 | 1 | 2 |
| 1009 | 1 | 2 |
| 1010 | 2 | 2 |
| 1011 | 2 | 2 |

The Downlink Control Information (DCI) carried by PDCCH contains a bit field that indicates the antenna port(s) (i.e., DMRS port(s)) and the number of antenna ports (i.e. the number of data layers) scheduled. For example, if port 1000 is indicated, then the PDSCH is a single layer transmission and the UE will use the DMRS defined by port 1000 to demodulate the PDSCH.

An example is shown in Table 3 below for DMRS Type 1 and with a single front loaded DMRS symbol (max-Length=1). The DCI indicates a "Value", and the corresponding DMRS port(s) can be found from the corresponding row in the table. The "Value" also indicates the number of CDM groups without data. This means that, if 1 is indicated, one CDM group contains the DMRS port(s), and the other CDM group in the same DMRS symbol can be used for data transmission to the UE (PDSCH case) in case the PDSCH time allocation includes the DMRS symbol(s). If the "Value" is 2, neither of the CDM groups can be used for data transmission even when the DMRS port(s) indicated for the UE is only in one CDM group. This configuration can be used to support Multi-User Multiple Input Multiple Output (MIMO) (MU-MIMO) by scheduling multiple User Equipments (UEs) in the same resource with each UE configured with different DMRS port(s). It can also be used to boost DMRS transmit power by 3 decibels (dB) if only a single UE is scheduled and the DMRS port(s) is in one CDM group, also referred to as Single User MIMO (SU-MIMO).

TABLE 3

Antenna port(s) (1000 + DMRS port), dmrs-Type = 1, maxLength = 1 (reproduced from Table 7.3.1.2.2-1 of 3gpp TS 38.212 V15.6.0)
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |

TABLE 3-continued

Antenna port(s) (1000 + DMRS port), dmrs-Type = 1, maxLength = 1 (reproduced from Table 7.3.1.2.2-1 of 3gpp TS 38.212 V15.6.0)
One Codeword:
Codeword 0 enabled,
Codeword 1 disabled

| Value | Number of DMRS CDM group(s) without data | DMRS port(s) |
|---|---|---|
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Table 4 shows the corresponding table for DMRS Type 2 with a single front loaded DMRS symbol (maxLength=1). In this case, two codewords can be supported with more than four DMRS ports. Indication of up to six DMRS ports (up to six layers) is possible with this configuration.

TABLE 4

Antenna port(s) (1000 + DMRS port), dmrs-Type = 2, maxLength = 1 (reproduced from Table 7.3.1.2.2-3 of 3gpp TS 38.212 V15.6.0)

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

Table 5 and Table 6 are the antenna port mapping tables for DMRS with two front loaded symbols. In these tables, additional entries are added to support different combinations of DMRS ports and CDM groups.

TABLE 5

Antenna port(s) (1000 + DMRS port), dmrs-Type = 1, maxLength = 2
(reproduced from Table 7.3.1.2.2-2 of 3gpp TS 38.212 v15.6.0)

| | One Codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 6

Antenna port(s) (1000 + DMRS port), dmrs-Type = 2, maxLength = 2
(reproduced from Table 7.3.1.2.2-4 of 3gpp TS 38.212 v15.6.0)

| | One codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |

TABLE 6-continued

Antenna port(s) (1000 + DMRS port), dmrs-Type = 2, maxLength = 2
(reproduced from Table 7.3.1.2.2-4 of 3gpp TS 38.212 v15.6.0)

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |

Thus, in NR Release 15, the antenna port table size varies with different DMRS configurations, i.e., type 1 or type 2 and the number of front loaded DMRS symbols. In NR Release 15, a UE determines the size of the antenna port bit field in DCI format 1_1 based on the DMRS configuration. Similarly, various antenna port tables are defined for DMRS port indication for UL PUSCH transmission. The table size also varies depending on DMRS configuration and whether transform precoding is enabled.

DCI format 1_1 is used in NR for the scheduling of PDSCH. It contains an "antenna port(s)" bit field for indication of DMRS port(s) used in a scheduled PDSCH by the DCI. The size of the bit field can be 4, 5, or 6 bits, depending on the DMRS configuration as defined by Tables 7.3.1.2.2-1/2/3/4 in 3GPP TS 38.212 as described above, where the number of CDM groups without data with values of 1, 2, and 3 refers to CDM groups {0}, {0,1}, and {0, 1, 2}, respectively. The antenna ports $\{p_0, \ldots, p_{v-1}\}$ are determined according to the ordering of DMRS port(s) given by Tables 7.3.1.2.2-1/2/3/4 in 3GPP TS 38.212.

For single Transmission/Reception Point (TRP) transmission, two DMRS ports of a PDSCH can be in either a same CDM group or two different CDM groups. For multi-TRP transmission, DMRS transmitted from different TRPs must be allocated in different CDM groups.

DCI format 0_1 is used for the scheduling of PUSCH in one cell. It also contains an "antenna ports" bit field for indication of DMRS port(s) used in a scheduled PUSCH by the DCI. The size of the bit field can be 2, 3, 4, or 5 bits, depending on the DMRS configuration and on whether transform precoding is enabled or disabled.

To support Ultra-Reliable Low-Latency Communication (URLLC) services and to provide more reliable PDCCH detection, in NR Release 16, it was agreed that a new compact DCI will be introduced. The new DCI is intended to have a configurable size for the "antenna ports" field, where the configurable size can have a smaller range of values than what is supported in NR Release 15.

There currently exist certain challenge(s). One challenge is how to determine and indicate antenna ports for the new compact DCI format that has configurable antenna ports field size. Design of a new set of antenna tables with smaller sizes than the existing tables for the same DMRS configuration for the new compact DCI format is a related challenge.

SUMMARY

Systems and methods are disclosed herein for determining and indicating antenna ports with a configurable antenna port field in Downlink Control Information (DCI). In one embodiment, a method performed by a wireless communication device for a cellular communications system comprises receiving a configuration from a network node, the configuration comprising a Demodulation Reference Signal (DMRS) configuration that comprises an indication of a type of DMRS used and a maximum number of front-loaded DMRS symbols, and an antenna port field configuration for an antenna port field in a Downlink Control Information (DCI) format. The method further comprises receiving a DCI of the DCI format from the network node for a corresponding physical channel, the received DCI comprising an antenna port field. The method further comprises determining a size of the antenna port field of the received DCI and a DMRS port table for interpreting a value comprised in the antenna port field of the received DCI based on at least the DMRS configuration and the antenna port field configuration, the determined DMRS port table being a subset of a master DMRS port table. The method further comprises determining one or more DMRS ports in the DMRS table used for the corresponding physical channel based on one or more of the determined size of the antenna port field, the DMRS port table, and the value of the antenna port field comprised in the DCI. In this manner, nested DMRS port tables are provided, which saves memory and table management resources at both the wireless communication device and the network node.

In one embodiment, the master DMRS port table is of size $2^{N_0}$, the determined DMRS table is a subset of the master DMRS port table and is of a size $2^N$, where N is the size of the antenna port field comprised in the received DCI and N is equal to or less than $N_0$, and the first $2^N$ entries of the master DMRS table form the determined DMRS port table.

In one embodiment, the size of the antenna port field is 0.

In one embodiment, when the size of the antenna port field is 0, the one or more DMRS ports is determined by the first entry of the determined DMRS table.

In one embodiment, the size of the antenna port field is $N_0$ where the master DMRS port table is of size $2^{N_0}$.

N=0. In one embodiment, when N=0, the one or more DMRS ports is determined by the first entry of the determined DMRS table. In one embodiment, $N=N_0$.

In one embodiment, the master DMRS port table is an existing DMRS port table of size $2^{N_0}$.

In one embodiment, the configuration further comprises a configuration for enabling or disabling of a transform precoder, and determining the DMRS port table for interpreting the value comprised in the antenna port field of the received DCI is further based on the configuration for enabling or disabling of the transform precoder.

In one embodiment, the corresponding physical channel is a physical uplink channel, the configuration further comprises a rank of uplink channel, and determining the DMRS port table for interpreting the value comprised in the antenna port field of the received DCI is further based on the rank of uplink channel.

In one embodiment, the corresponding physical channel is a physical downlink shared channel.

In one embodiment, the corresponding physical channel is a physical uplink channel.

In one embodiment, whether both single front-loaded DMRS symbols and two front-loaded DMRS symbols are supported in the determined DMRS port table or whether only single front-loaded DMRS symbol is supported in the determined DMRS table depends on the size of the antenna ports field comprised in the DCI.

In one embodiment, whether one code division multiplexing (CDM) group without data for DMRS or more than one CDM group without data is supported for DMRS in the determined DMRS port table depends on the size of the antenna ports field comprised in the DCI.

Corresponding embodiments of a wireless communication device are also disclosed. In one embodiment, a wireless communication device for a cellular communications system is adapted to receive a configuration from a network node, the configuration comprising a DMRS configuration that comprises an indication of a type of DMRS used and a maximum number of front-loaded DMRS symbols, and an antenna port field configuration for an antenna port field in a DCI format. The wireless communication device is further adapted to receive a DCI of the DCI format from the network node, the received DCI comprising an antenna port field. The wireless communication device is further adapted to determine a size of the antenna port field of the received DCI and a DMRS port table for interpreting a value comprised in the antenna port field of the received DCI based on at least the DMRS configuration and the antenna port field configuration, the determined DMRS port table being a subset of a master DMRS port table. The wireless communication device is further adapted to determine one or more DMRS ports in the DMRS table used for the corresponding physical channel based on one or more of the determined bit size of the antenna port field, the determined DMRS port table, and the value of the antenna port field comprised in the DCI.

In one embodiment, a wireless communication device for a cellular communications system comprises one or more transmitters, one or more receivers, and processing circuitry associated with the one or more transmitters and the one or more receivers. The processing circuitry is configured to cause the wireless communication device to receive a configuration from a network node, the configuration comprising a DMRS configuration that comprises an indication of a type of DMRS used and a maximum number of front-loaded DMRS symbols, and an antenna port field configuration for an antenna port field in a DCI format. The processing circuitry is further configured to cause the wireless communication device to receive a DCI of the DCI format from the network node for a corresponding physical channel, the received DCI comprising an antenna port field. The processing circuitry is further configured to cause the wireless communication device to determine a size of the antenna port field of the received DCI and a DMRS port table for interpreting a value comprised in the antenna port field of the received DCI based on at least the DMRS configuration and the antenna port field configuration, the determined DMRS port table being a subset of a master DMRS port table. The processing circuitry is further configured to cause the wireless communication device to determine one or more DMRS ports in the DMRS table used for the corresponding physical channel based on one or more of the determined size of the antenna port field, the determined DMRS port table, and the value of the antenna port field comprised in the DCI.

Embodiments of a method performed by a network node are also disclosed herein. In one embodiment, a method performed by a network node for facilitating determination of DMRS antenna ports comprises sending a configuration to a wireless communication device, the configuration comprising a DMRS configuration that comprises an indication of a type of DMRS used and a maximum number of front-loaded DMRS symbols, and an antenna port field configuration for an antenna port field in a DCI format. The method further comprises sending a DCI of the DCI format to the wireless communication device, wherein the DCI comprises an antenna port field with a size determined by one or more of the DMRS configuration and the antenna port field size configuration, the antenna port field indicates one or more DMRS ports in a DMRS table used for a corresponding physical channel, and the one or more DMRS ports and the DMRS table are determined by one or more of the antenna port field size configuration, the DMRS configuration, and a value comprised in the antenna port field of the DCI, wherein the DMRS table is a subset of a master DMRS port table.

In one embodiment, the master DMRS port table is of size $2^{N_0}$, the DMRS table is a subset of the master DMRS port table and is of a size $2^N$, where N is the size of the antenna port field comprised in the received DCI and N is equal to or less than $N_0$, and the first $2^N$ entries of the master DMRS table form the DMRS port table.

In one embodiment, the size of the antenna port field is 0.

In one embodiment, the size of the antenna port field is $N_0$ where the master DMRS port table is of size $2^{N_0}$.

In one embodiment, the master DMRS port table is an existing DMRS port table of size $2^{N_0}$.

In one embodiment, the configuration further comprises a configuration for enabling or disabling of a transform precoder, and the DMRS port table for interpreting the value comprised in the antenna port field of the received DCI is further determined based on the configuration for enabling or disabling of the transform precoder.

In one embodiment, the corresponding physical channel is a physical uplink channel, the configuration further comprises a rank of uplink channel, and the DMRS port table for interpreting the value comprised in the antenna port field of the received DCI is further determined based on the rank of uplink channel.

In one embodiment, the corresponding physical channel is a physical downlink shared channel transmission.

In one embodiment, the corresponding physical channel is a physical uplink channel.

In one embodiment, whether both single front-loaded DMRS symbols and two front-loaded DMRS symbols are supported in the DMRS port table or whether only single front-loaded DMRS symbol is supported in the DMRS table depends on the size of the antenna ports field comprised in the DCI.

In one embodiment, whether one CDM group without data for DMRS or more than one CDM group without data is supported for DMRS in the determined DMRS port table depends on the size of the antenna ports field comprised in the DCI.

Corresponding embodiments of a network node are also disclosed. In one embodiment, a network node for facilitating determination of DMRS antenna ports is adapted to send a configuration to a wireless communication device, the configuration comprising a DMRS configuration that comprises an indication of a type of DMRS used and a maximum number of front-loaded DMRS symbols, and an antenna port field configuration for an antenna port field in a DCI format. The network node is further adapted to send a DCI of the DCI format to the wireless communication device, wherein the DCI comprises an antenna port field with a size determined by one or more of the DMRS configuration and the antenna port field size configuration, the antenna port field indicates one or more DMRS ports in a DMRS table used for a corresponding physical channel, and the one or more DMRS ports and the DMRS table are determined by one or more of the antenna port field size configuration, the DMRS configuration, and a value comprised in the antenna port field of the DCI, wherein the DMRS table is a subset of a master DMRS port table.

In one embodiment, a network node for facilitating determination of DMRS antenna ports comprises processing circuitry configured to cause the network node to send a configuration to a wireless communication device, the configuration comprising a DMRS configuration that comprises an indication of a type of DMRS used and a maximum number of front-loaded DMRS symbols, and an antenna port field configuration for an antenna port field in a DCI format. The processing circuitry is further configured to cause the network node to send a DCI of the DCI format to the wireless communication device, wherein the DCI comprises an antenna port field with a size determined by one or more of the DMRS configuration and the antenna port field size configuration, the antenna port field indicates one or more DMRS ports in a DMRS table used for a corresponding physical channel, and the one or more DMRS ports and the DMRS table are determined by one or more of the antenna port field size configuration, the DMRS configuration, and a value comprised in the antenna port field of the DCI, wherein the DMRS table is a subset of a master DMRS port table.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 11 through 14 are flow charts that illustrate example embodiments of methods implemented in a communication system such as that of FIG. 9.

DETAILED DESCRIPTION

Figure 1:
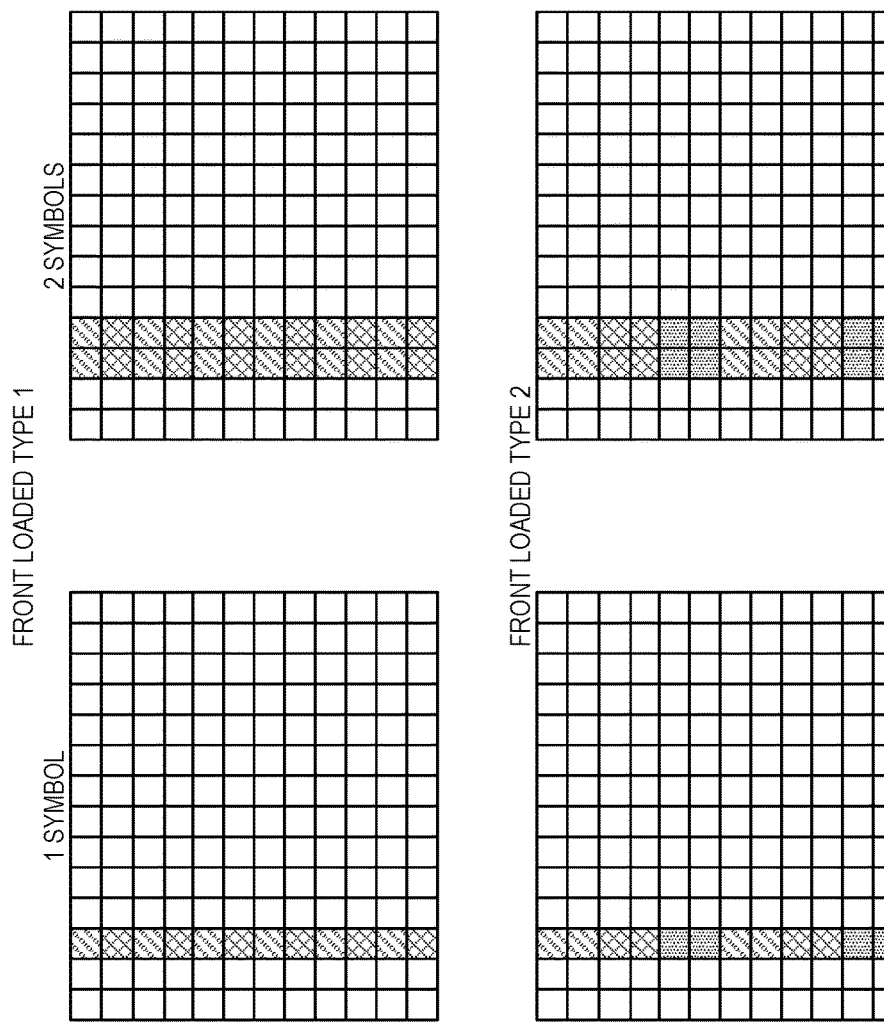
FIG. 1 shows the mapping of front-loaded Demodulation Reference Signal (DMRS) for configuration type 1 and type 2 with single-symbol and double-symbol DMRS with the first DMRS in the third Orthogonal Frequency Division Multiplexing (OFDM) symbol (OFDM symbol #2) of a transmission interval of fourteen OFDM symbols.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, there currently exist certain challenge(s) in relation to the new compact Downlink Control Information (DCI) agreed to in NR Release 16. One challenge is how to determine and indicate antenna ports for the new compact DCI format that has configurable antenna ports field size. Design of a new set of antenna tables with smaller sizes than the existing tables for the same DMRS configuration for the new compact DCI format is a related challenge.

Certain aspects of the present disclosure and their embodiments may provide solutions to the aforementioned or other challenges. For Ultra-Reliable Low-Latency Communication (URLLC) services, a different set of antenna tables with smaller sizes can be configured to a UE. The size of the "antenna ports" field in DCI can be configurable, with the size of this field potentially being smaller than that of the existing non-fallback DCI (i.e., DCI format 0-0 or 1-0). For example, the size of the antenna ports field can be from 0 to ($N_0$-1) bits for the new DCI scheduling downlink (DL) transmission and the new DCI scheduling UL transmission. Here, $N_0$ is the number of bits for the antenna port field in the existing DCI format 1_1 and 0_1. In one solution, the tables associated with different sizes of the antenna ports field are nested such that the first $2^{(N-1)}$ entries of a table associated with a N bits antenna port field forms the table associated with a (N-1) bits antenna port field. In a second solution, a bitmap is used together with a DMRS configuration and either the new or existing antenna tables to construct an antenna port table for DCI with N bits configured antenna port field. The same methodology can be applied to the new DCI scheduling DL data transmission, as well as UL data transmission.

There are, proposed herein, various embodiments which address one or more of the issues disclosed herein. In one embodiment, a method performed by a wireless device for determining an antenna port includes receiving a configuration and control information from a network node. The control information includes an antenna port field. A format of the control information is determined, and the format of the control information is associated with an antenna port field size. A table to be used for determining the antenna port is identified based on the configuration and the antenna port field size. The antenna port is determined based on the table and the value of the antenna port field. In one embodiment, the configuration is a demodulation reference signal (DMRS) configuration, the control information is DCI, and the table is a DMRS antenna port table. In one embodiment, identifying the table to be used for determining the antenna port comprises identifying a subset of a master table to be used for determining the antenna port.

In some cases, the wireless device may receive a table indicator from the network node, which is used to identify the table or the subset of the table. The table indicator may be a bitmap such that set bits in the bitmap indicate that a corresponding row in the master table is included in the subset of the table.

Certain embodiments may provide one or more of the following technical advantage(s). With nested antenna tables, UE and gNB memory and table management can be saved, e.g., a single pointer can be used for different sizes of the tables for a given DMRS configuration. With the bitmap-based solution, the existing antenna tables can be used without defining a new set of tables.

Figure 2:
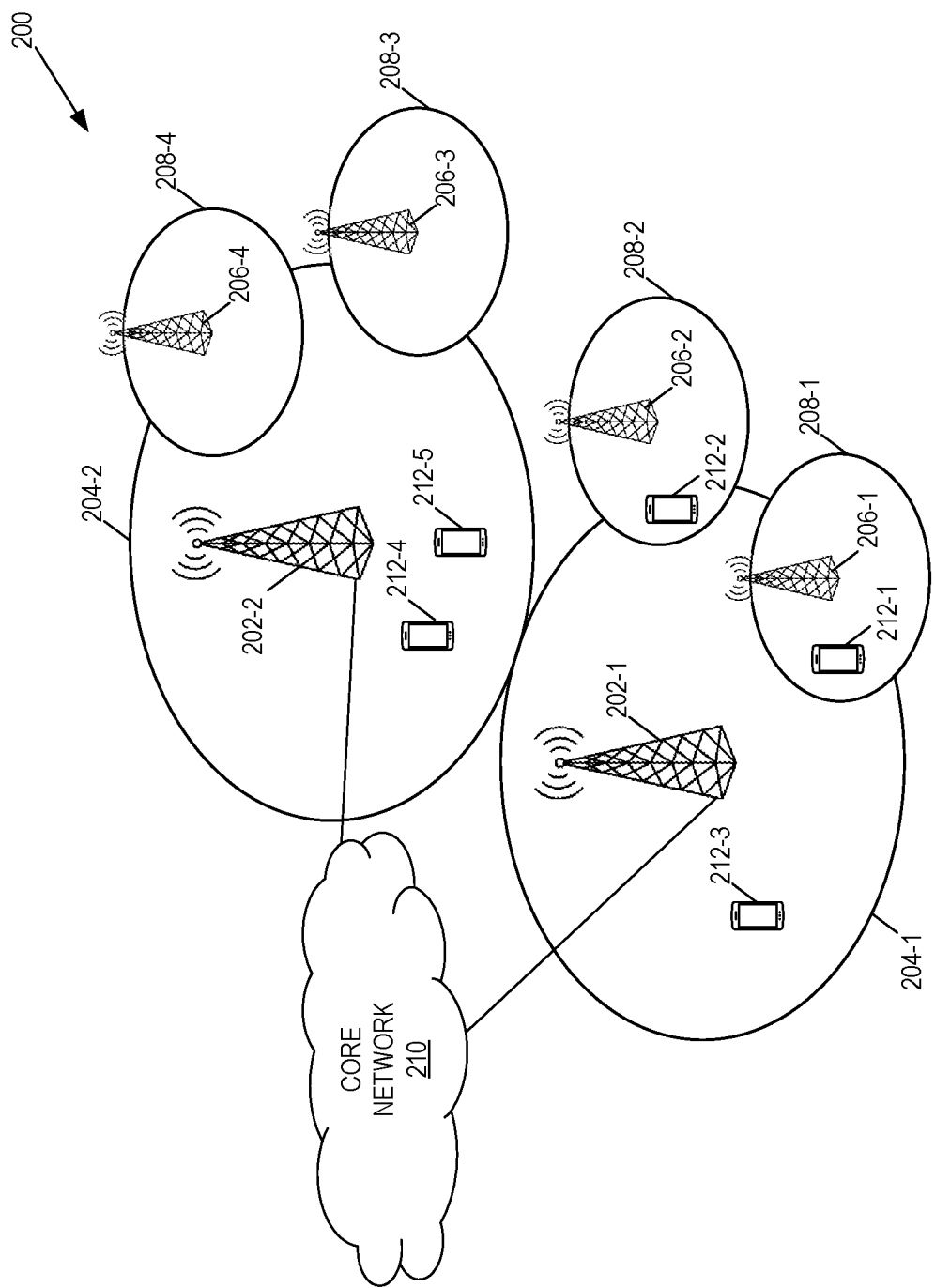
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G system (5GS) including a NR RAN or LTE RAN (i.e., E-UTRA RAN). In this example, the RAN includes base stations 202-1 and 202-2, which in 5G NR are referred to as gNBs or ng-eNBs (i.e., LTE RAN nodes connected to 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto. Thus, the wireless communication devices 212 are sometimes referred to herein as "UEs 212".

The Release 15 antenna table design was mainly for enhanced Mobile Broadband (eMBB) in which a UE may support up to eight Multiple-Input Multiple-Output (MIMO) layers for high peak data rate or up to twelve UEs may be scheduled in the same resource by using orthogonal DMRS to maximize system throughput. Even larger number of UEs can be co-scheduled with non-orthogonal DMRS ports, i.e. where different scrambling sequences are used for the DMRS ports to different users.

For high reliability services, such as URLLC, the main design goal is to deliver data reliably. Therefore, for URLLC, neither Multi-User MIMO (MU-MIMO) nor Single-User MIMO (SU-MIMO) with more than two layers may be supported in the DL. Similarly, up to two layers per UE may be supported in the UL.

Related to the anticipated reduction of MIMO layers for data transmission, it has been agreed that the new DCI format for PDSCH scheduling supports a single transport block (TB) only. Hence, it does not include information specific for transport block 2 (i.e., Modulation and Coding Scheme (MCS), New Data Indicator (NDI), Redundancy Version (RV)). Additionally, Code Block Group (CBG) transmission is not supported for both PDSCH and PUSCH. For PDSCH scheduling, the DCI fields excluded are: "CBG transmission information" and "CBG flushing information". For PUSCH scheduling, the DCI field excluded is "CBG transmission information".

In the following discussion, a new proposed DCI format for scheduling downlink data transmission is called DCI format 1_X, and a new proposed DCI format for scheduling uplink data transmission is called DCI format 0_X. Here "1_X" and "0_X" are temporary labels and stand in for the DCI formats that may be adopted by NR specification, which use higher-layer configurable antenna port field size.

DCI format 1_X and 0_X can be used to serve any type of traffic including eMBB and URLLC (i.e., not limited to URLLC traffic only).

Also, DCI format 1_X and 0_X may be used to activate and/or release semi-persistently scheduled transmissions. That is, DCI format 0_X may be used to activate and/or release one or more configurations of uplink configured grant (UL CG), and DCI format 1_X can be used to activate and/or release one or more configurations of downlink semi-persistent scheduled (DL SPS) transmission. When used for activation of UL CG or DL SPS, the antenna port information carried by DCI format 0_1 and 1_1, respectively, is used by the associated PUSCH and PDSCH transmissions, respectively.

Additionally, while DCI format 1_X and 0_X are used to discuss downlink and uplink data transmission, respectively, the same methodology can be applied to sidelink. For example, another DCI format (for example, DCI format 3_X) can be constructed for sidelink, where the antenna port field of DCI format 3_X is configurable.

Figure 3:
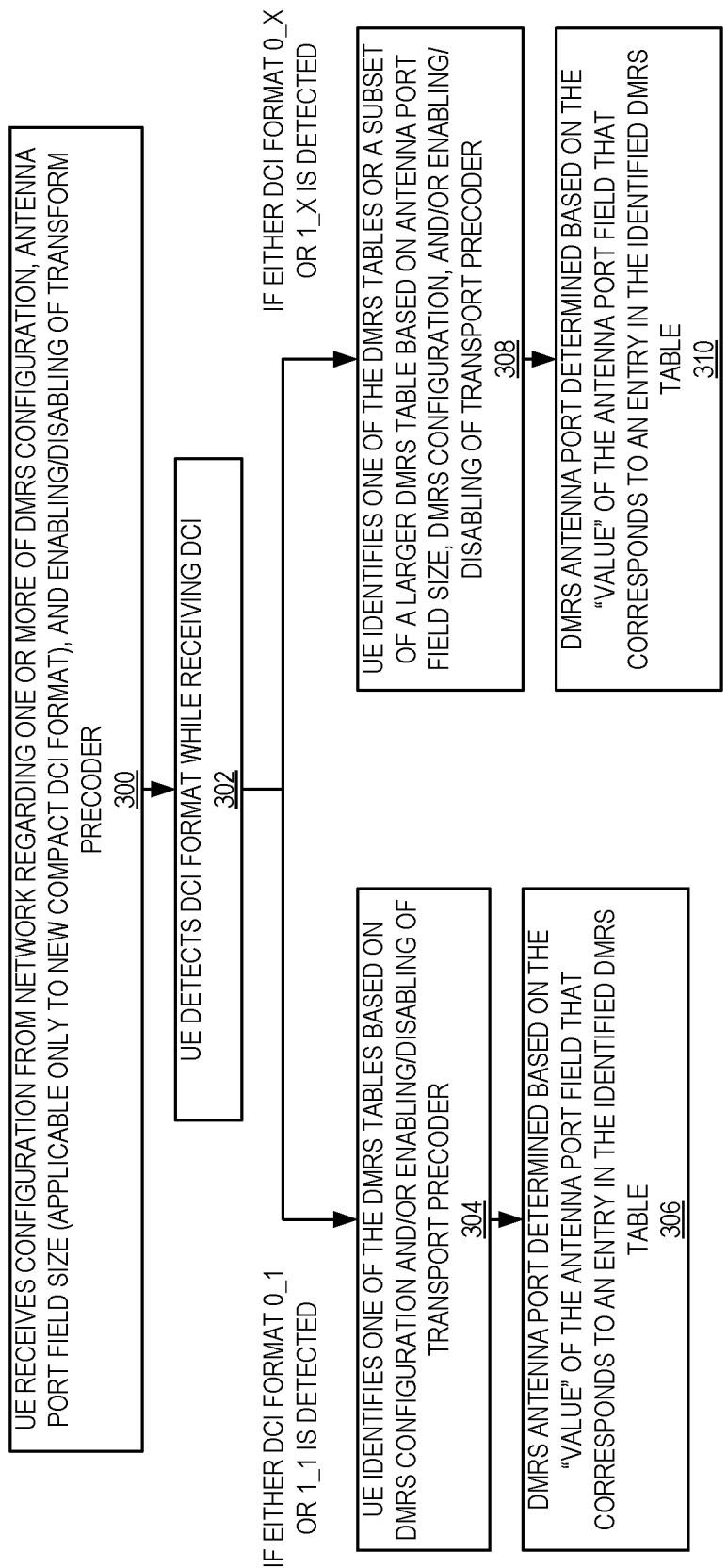
FIG. 3 is a flowchart that illustrates the operation of a User Equipment (UE) in accordance with embodiments of the present disclosure.

A flowchart of a general embodiment is depicted in FIG. 3. In step 300, a UE 212 may receive higher-layer configuration (e.g., Radio Resource Control (RRC) configuration) from the network (e.g., from a base station 202) regarding one or more of the following:
- a DMRS configuration which may comprise an indication of the type of DMRS used (i.e., whether type1 DMRS or type2 DMRS is used) and the maximum number of front-loaded DMRS symbols (i.e., whether maxLength=1 or maxLength=2);
- a configuration parameter indicating the antenna port field size (i.e., the number of bits in the antenna port field) which is applicable only to the new UL/DL DCI formats; and
- a configuration for enabling/disabling transform precoder in the case of UL.

In step 302, the UE 212, while receiving a DCI via a PDCCH, detects the DCI format. The detected DCI format can be DCI format 0_1/1_1 which is supported from NR Release 15 or the new compact DCI format 0_X/1_X for UL/DL introduced in NR Release 16.

Depending on whether the detected DCI belongs to one of DCI formats 0_1/1_1 or the detected DCI belongs to one of DCI format 0_X/1_X (i.e., the UL/DL new compact DCI formats introduced in NR Release 16), the UE 212 follows different procedures for determining and indicating the DMRS antenna ports. If the UE 212 detected DCI format 1_1 or DCI format 0_1, the process moves to step 304. In step 304, if the UE 212 detected DCI format 1_1, the DMRS table to be used is identified purely based on DMRS configuration. If the UE 212 detected DCI format 0_1, the DMRS table to be used is identified using both the DMRS configuration and the enabling/disabling of transform precoding. In step 306, the DMRS antenna port is then determined based on the "Value" of the antenna port field that corresponds to an entry in the identified DMRS table.

If the UE 212 detected DCI format 1_X or 0_X, the process moves to step 308. In step 308, if the UE 212 detected DCI format 1_X, the DMRS table to be used is identified among one or more tables by jointly using the following:
- antenna port field size configured for DCI format 1_X, and
- DMRS configuration.

Consider an example where the UE 212 is configured with a particular DMRS configuration (type 1 DMRS with maximum number of front loaded DMRS symbols is maxLength=1). In this case, there may be different DMRS tables predefined in specifications for this DMRS configuration corresponding to different number of bits in the antenna ports field. A first DMRS table may correspond to DMRS type 1, maxLength=1, and antenna port field size of 1 bit. A second DMRS table may correspond to DMRS type 1, maxLength=1, and antenna port field size of 2 bits. A third DMRS table may correspond to DMRS type 1, maxLength=1, and antenna port field size of 3 bits. Hence, using this embodiment, the UE 212 can identify which DMRS table to use among the three tables by jointly using the DMRS configuration and the antenna port field size configured for DCI format 1_X. For example, if DCI format 1_X contains an antenna port field of size 3, then the third predefined DMRS table is determined by the UE 212. Note that this embodiment is different from what is known in NR Release 15 where the DMRS table to be used in the case of DCI format 1_1 is only based on DMRS configuration.

In an alternative embodiment, the DMRS configuration defines a single, "master" antenna port table in the same fashion as in NR Release 15, but the antenna port field size configured for DCI format 1_X defines an antenna port table subset, where the antenna port subset corresponds to a subset of rows of the master antenna port table. For instance, an antenna port field size of 4 bits may corresponds to the entire master antenna port table while an antenna port field size of 3 bits may corresponds to a subset of rows form the master antenna port table, where the size of the subset is equal to half the number of rows of the table.

In a further variant of this embodiment, the different DMRS tables corresponding different antenna port field sizes may have different properties with respect to support of the number of front loaded DMRS symbols, the number of CDM groups without data, and the number of supported ranks. Details of these embodiments are described further below. Note that even though the above embodiments are written in terms of different DMRS tables corresponding to different antenna port field sizes, these embodiments can be easily extended for the case where different subsets of a larger DMRS table corresponding to different antenna port field sizes.

If the UE 212 detected DCI format 0_X, then in step 308 the DMRS table to be used is identified among one or more tables by jointly using the following:
- antenna port field size configured for DCI format 0_X,
- DMRS configuration,
- enabling/disabling of transform precoder, and
- rank of UL transmission.

Consider an example where the UE 212 is configured with a particular DMRS configuration (type 1 DMRS with maximum number of front loaded DMRS symbols is maxLength=1) with transform precoder disabled. In this case, there may be different DMRS tables predefined in specifications for this DMRS configuration and transform precoder disabled corresponding to different number of bits in the antenna ports field. A first DMRS table may correspond to DMRS type 1, maxLength=1, transform precoder disabled, rank =1 and antenna port field size of 1 bit. A second DMRS table may correspond to DMRS type 1, maxLength=1, transform precoder disabled, rank=1 and antenna port field size of 2 bits. A third DMRS table may correspond to DMRS type 1, maxLength=1, transform precoder disabled, rank=1, and antenna port field size of 3 bits. Hence, using this embodiment, the UE 212 can identify which DMRS table to use among the three tables by jointly using the DMRS configuration and the antenna port field size configured for DCI format 0_X. For example, if DCI format 0_X is configured with an antenna port field of size 3, then the third predefined DMRS table is determined by the UE. Note that this embodiment is different from what is known in NR Release 15 where the DMRS table to be used in the case of DCI format 0_1 is only based on DMRS configuration and enabling/disabling of transform precoder.

In a further variant of this embodiment, the different DMRS tables corresponding different antenna port field sizes may have different properties with respect to support of the number of front loaded DMRS symbols, the number of CDM groups without data, and the number of supported ranks. Details of these embodiments are described further below. Note that even though the above embodiments are written in terms of different DMRS tables corresponding to different antenna port field sizes, these embodiments can be easily extended for the case where different subsets of a larger DMRS table corresponding to different antenna port field sizes.

From step 308, the DMRS antenna port is determined based on the "Value" of the antenna port field that corresponds to the entry in the identified DMRS table (step 310). As will be appreciated by one of skill in the art, once the UE 212 has determined the DMRS antenna port, the UE 212 uses the determined DMRS antenna port for demodulation.

In some embodiments, the new set of antenna port indication tables may be designed to accommodate both one and two front-loaded DMRS configurations. For example, two front-loaded DMRS symbol may be configured to improve channel estimation performance. In some embodiments, whether both single front-loaded DMRS symbols and two front-loaded DMRS symbols are supported in a DMRS table or whether only single front-loaded DMRS symbol is supported in a DMRS table depends on the antenna port field size associated with the DMRS table. For example, if the antenna port field size is 1, then only two entries are possible in the DMRS table. In this case, the DMRS table may only support single front-loaded DMRS symbol. However, if antenna port field size is 3, then up to eight entries are possible in the DMRS table. Hence, a combination of both single front-loaded DMRS symbols and two front-loaded DMRS symbols are supported in different entries of a DMRS table. The benefit of including different entries (some entries with single front-loaded DMRS symbols and some other entries with two front-loaded DMRS symbols) is as follows. A UE that may have good coverage may require only a single front-loaded DMRS symbol as the channel estimation accuracy should already be good enough for this UE. However, a UE that may not have good coverage may require additional two front-loaded DMRS symbol entries to improve channel estimation performance.

In some embodiments, the new tables may include one or more than one CDM group without data for DMRS for power boosting purpose. For example, 3 dB power boosting if two CDM groups without data is configured. In some embodiments, whether one CDM groups without data for DMRS and more than one CDM group without data is supported in a DMRS table depends on the antenna port field size associated with the DMRS table. For example, if the antenna port field size is 1, then only two entries are possible in the DMRS table. In this case, the DMRS table may only support entries with one CDM groups without data for DMRS. However, if antenna port field size is 3, then up to eight entries are possible in the DMRS table. Hence, in this case, a combination of entries with some entries supporting only one CDM groups without data for DMRS and some entries supporting more than one CDM groups without data for DMRS are supported of a DMRS table with eight entries.

The benefit of including different entries (some entries with one CDM groups without data for DMRS and some other entries with more than one CDM groups without data for DMRS) is as follows. A UE that may have good coverage may require one CDM groups without data for DMRS as this UE likely does not need DMRS power boosting. For this UE, the data can be transmitted in the other CDM groups. However, a UE that may not have good coverage may benefit from DMRS power boosting. Hence, for this UE it is beneficial to indicate more than one CDM groups without data for DMRS.

In some embodiments, the new tables support both type 1 and type 2 DMRS configurations. For example, using type 1 configuration for better channel estimation and type 2 for more DMRS power boosting as three CDM groups without data can be configured.

The new tables may also support PDSCH transmission over more than one TRP for increased reliability through TRP diversity. The new tables may also support PUSCH transmission towards more than one TRP for increased reliability through TRP diversity.

With the above consideration in mind, some examples of antenna tables for different DMRS configurations are shown in Table 7 to Table 12, which may be used for DCI format 1_X. In allocating the table entries, the more reliable schemes such as, a single layer MIMO transmission and DMRS with power boosting, can be allocated first so that they can be selected by a DCI with smaller antenna port field size. Small DCI size also means more reliable PDCCH transmission and better coverage. This would help to ensure similar reliability and coverage for PDSCH (or PUSCH) and PDCCH.

For a given DMRS type configured by higher layer parameter dmrs-Type, a maximum front-loaded symbol length given by higher layer parameter maxLength, a corresponding antenna port table from Table 7 to Table 12 can be determined. The table can be considered as some sort of a "master" table.

For the examples in Table 7 to Table 12, the size of the "antenna ports" field of DCI Format 1_X can be configured with N=0, 1, 2, 3, or 4 bits. Note that $0<=N<=N_0$, where $2^{N_0}$ is the size of the "master" tables.

In one embodiment, the first $2^N$ entries of the master antenna port table would be used when the number of configured bits for the "antenna ports" field is N>0, i.e., the tables with different sizes are nested.

For example, for type 1 DMRS with a maximum of one front-loaded symbol, if N=1 is configured, the $1^{st}$ two entries in Table 7 would be used and only a single layer transmission is supported, either with or without 3dB power boosting. If up-to-2 layers are to be supported, N=2 may be configured. If multi-TRP is also to be supported, N=3 may be configured so that Value=4 can be signaled.

For type 1 DMRS with maximum two front-loaded symbols, if N=1 is configured, the $1^{st}$ two entries (or rows) in Table 8 would be used and only a single layer transmission with 3 dB power boosting is supported, either with one or two front-loaded symbols. If N=2 is configured, the $1^{st}$ 4 entries (or 4 rows) would be used to also support a single layer without power boosting. If N=3 is configured, the $1^{st}$ 8 entries (or 8 rows) would be used to support up-to-2 layers. If multi-TRP is also to be supported, N=4 may be configured so that Value=8,9 can be signaled.

Alternatively, for type 1 DMRS with maximum two front-loaded symbols, only two front-loaded symbols are considered for more reliability on DMRS based channel estimation. The corresponding example is shown in Table 9, where up to 3 bits may be configured.

Similarly, for type 2 DMRS with maximum one front-loaded symbol, if N=1 is configured, the 1st two entries in Table 10 would be used and only a single layer transmission with power boosting is supported, either with 3 dB or 4.77 dB power boosting. If up-to-2 layers are to be supported, N=2 may be configured. If multi-TRP or more than 3 dB power boosting is also to be supported, N=3 may be configured.

For type 2 DMRS with maximum two front-loaded symbols, if N=1 is configured, the $1^{st}$ two entries in Table 11 would be used and only a single layer transmission with 4.77 dB power boosting is supported, either with one or two front-loaded symbols. If N=2 is configured, the 1st 4 entries would be used to also support 3 dB power boosting. If N=3 is configured, the 1st 8 entries would be used to support up-to-2 layers. If multi-TRP or more than 3dB power boosting is to be supported, N=4 may be configured.

Again, for type 2 DMRS with maximum two front-loaded symbols, an alternative option is to consider only two front-loaded symbols for more reliability on DMRS based channel estimation. The corresponding example is shown in Table 12, where up to 3 bits may be configured.

In another embodiment, the subset of entries of the antenna port table which are to be used for a configured N may be flexibly configured by the gNB to the UE as part of the DMRS configuration based on either the examples shown in Table 7 to Table 12 or based on the existing antenna port tables specified in Tables 7.3.1.2.2-1/2/3/4 of 3GPP TS38.212 v15.6.0. For instance, a bitmap of size $2^{N_0}$ may be used, wherein the bitmap has $2^N$ bits set to one and where a bit set to one indicates that the corresponding row of the master antenna port table is included in the antenna port subset. The least significant bit (LSB) of the bitmap can be associated with the first row and the most significant bit (MSB) with the last row of the master antenna port table. Alternatively, the LSB may be associated with the last row and the MSB with the first row. The subset of entries forms a new table of size $2^N$ in increasing order of "Value" in the master antenna port table.

In a variant of this embodiment, the number of bits of the antenna port field is not explicitly indicated to the UE but is implicitly indicated via the configuration bitmap. For instance, if the bitmap contains M ones, the UE determines that the antenna port field size is $N=\lceil \log_2 M \rceil$. In case Tables 7.3.1.2.2-1/2/3/4 of 3GPP TS38.212 v15.6.0 is used for the purpose, $N_o$ is the number of bits for "antenna port" field in the existing DCI format 1_1.

TABLE 7

Antenna port(s) (1000 + DMRS port), dmrs-Type = 1, maxLength = 1

One Codeword:

| Value | Number of DMRS CDM group(s) without data | DMRS port(s) | Number of front-load symbols | Note |
|---|---|---|---|---|
| 0 | 1 | 0 | 1 | 1 layer, no power boosting |
| 1 | 2 | 0 | 1 | 1 layer, with 3 dB power boosting |
| 2 | 1 | 0, 1 | 1 | 2 layers, no power boosting |
| 3 | 2 | 0, 1 | 1 | 2 layers, with 3 dB power boosting |

TABLE 7-continued

Antenna port(s) (1000 + DMRS port), dmrs-Type = 1, maxLength = 1

One Codeword:

| Value | Number of DMRS CDM group(s) without data | DMRS port(s) | Number of front-load symbols | Note |
|---|---|---|---|---|
| 4 | 2 | 0, 2 | 1 | 2 layers, each from one TRP, multi-TRP support |
| 5-7 | reserved | | | |

TABLE 8

Antenna port(s) (1000 + DMRS port), dmrs-Type = 1, maxLength = 2

One Codeword:

| Value | Number of DMRS CDM group(s) without data | DMRS port(s) | Number of front-load symbols | Note |
|---|---|---|---|---|
| 0 | 2 | 0 | 1 | 1 layer, 3 dB power boosting |
| 1 | 2 | 0 | 2 | 1 layer, 3 dB power boosting |
| 2 | 1 | 0 | 1 | 1 layer, 0 dB power boosting |
| 3 | 1 | 0 | 2 | 1 layer, 0 dB power boosting |
| 4 | 2 | 0, 1 | 1 | 2 layers, 3 dB power boosting |
| 5 | 2 | 0, 1 | 2 | 2 layers, 3 dB power boosting |
| 6 | 1 | 0, 1 | 1 | 2 layers, 0 dB power boosting |
| 7 | 1 | 0, 1 | 2 | 2 layers, 0 dB power boosting |
| 8 | 2 | 0, 2 | 1 | 2 layers, each from one TRP, multi-TRP support |
| 9 | 2 | 0, 2 | 2 | 2 layers, each from one TRP, multi-TRP support |
| 10_15 | reserved | | | |

TABLE 9

Alternative option for Antenna port(s) (1000 + DMRS port), dmrs-Type = 1, maxLength = 2

One Codeword:

| Value | Number of DMRS CDM group(s) without data | DMRS port(s) | Number of front-load symbols | Note |
|---|---|---|---|---|
| 0 | 2 | 0 | 2 | 1 layer, 3 dB power boosting |
| 1 | 1 | 0 | 2 | 1 layer, 0 dB power boosting |
| 2 | 2 | 0, 1 | 2 | 2 layers, 3 dB power boosting |
| 3 | 1 | 0, 1 | 2 | 2 layers, 0 dB power boosting |
| 4 | 2 | 0, 2 | 2 | 2 layers, each from one TRP, multi-TRP support |
| 5-7 | reserved | | | |

TABLE 10

Antenna port(s) (1000 + DMRS port), dmrs-Type = 2, maxLength = 1

One Codeword:

| Value | Number of DMRS CDM group(s) without data | DMRS port(s) | Note |
|---|---|---|---|
| 0 | 2 | 0 | 1 layer, 3 dB power boosting |
| 1 | 3 | 0 | 1 layer, with 4.77 dB power boosting |
| 2 | 2 | 0, 1 | 2 layers, 3 dB power boosting |
| 3 | 3 | 0, 1 | 2 layers, 4.77 dB power boosting |
| 4 | 2 | 0, 2 | 2 layers, each from one TRP, multi-TRP support, 3 dB power boosting |
| 5 | 3 | 0, 2 | 2 layers, each from one TRP, multi-TRP support, 4.77 dB power boosting |
| 6-7 | reserved | | |

TABLE 11

Antenna port(s) (1000 + DMRS port), dmrs-Type = 2, maxLength = 2

One Codeword:

| Value | Number of DMRS CDM group(s) without data | DMRS port(s) | Number of front-load symbols | Note |
|---|---|---|---|---|
| 0 | 3 | 0 | 1 | 1 layer, with 4.77 dB power boosting |
| 1 | 3 | 0 | 2 | 1 layer, with 4.77 dB power boosting |
| 2 | 2 | 0 | 1 | 1 layer, 3 dB power boosting |
| 3 | 2 | 0 | 2 | 1 layer, 3 dB power boosting |
| 4 | 1 | 0 | 1 | 1 layer, 0 dB power boosting |
| 5 | 1 | 0 | 2 | 1 layer, 0 dB power boosting |
| 6 | 3 | 0, 1 | 1 | 2 layers, 4.77 dB power boosting |
| 7 | 3 | 0, 1 | 2 | 2 layers, 4.77 dB power boosting |
| 8 | 2 | 0, 1 | 1 | 2 layers, with 3 dB power boosting |
| 9 | 2 | 0, 1 | 2 | 2 layers, with 3 dB power boosting |
| 10 | 1 | 0, 1 | 1 | 2 layers, no power boosting |
| 11 | 1 | 0, 1 | 2 | 2 layers, no power boosting |
| 12 | 2 | 0, 2 | 1 | 2 layers, each from one TRP, multi-TRP support, 3 dB power boosting |
| 13 | 2 | 0, 2 | 2 | 2 layers, each from one TRP, multi-TRP support, 3 dB power boosting |
| 14 | 3 | 0, 2 | 1 | 2 layers, each from one TRP, multi-TRP support, 4.77 dB power boosting |
| 15 | 3 | 0, 2 | 2 | 2 layers, each from one TRP, multi-TRP support, 4.77 dB power boosting |

TABLE 12

An alternative option for Antenna port(s) (1000 + DMRS port), dmrs-Type = 2, maxLength = 2

One Codeword:

| Value | Number of DMRS CDM group(s) without data | DMRS port(s) | Number of front-load symbols | Note |
|---|---|---|---|---|
| 0 | 3 | 0 | 2 | 1 layer, with 4.77 dB power boosting |
| 1 | 2 | 0 | 2 | 1 layer, 3 dB power boosting |
| 2 | 1 | 0 | 2 | 1 layer, 0 dB power boosting |
| 3 | 3 | 0, 1 | 2 | 2 layers, 4.77 dB power boosting |
| 4 | 2 | 0, 1 | 2 | 2 layers, with 3 dB power boosting |
| 5 | 1 | 0, 1 | 2 | 2 layers, no power boosting |
| 6 | 2 | 0, 2 | 2 | 2 layers, each from one TRP, multi-TRP support, 3 dB power boosting |
| 7 | 3 | 0, 2 | 2 | 2 layers, each from one TRP, multi-TRP support, 4.77 dB power boosting |

For UL transmission associated with DCI format 0_X, it is assumed that only up to rank 2 transmission is supported. Some limited MU-MIMO use cases may be supported. While not described in the example tables below, it is also possible that the tables are constructed to include uplink multi-TRP support, similar to those for DL transmission.

Examples of the antenna tables for DCI format 0_X are shown in Table 13 to Table 22, where N=0, 1, 2, or 3 may be configured for the antenna port field size in the DCI. For a given DMRS type, dmrs-Type, a maximum front-loaded symbol length, maxLength, a rank, and whether transform precoder is disabled, a corresponding antenna port table is determined. The table can be considered as a "master" table. When N=0 is configured, the first entry of the table is used. When N=1 is configured, the two code points (0,1) of the antenna port field are mapped to the first two entries of the master table, i.e., mapped to Value=0 and 1, respectively. When N=2 is configured, the four code points (0,1,2,3) are mapped to the first four entries of the master table. Similarly, when N=3, the eight code points are mapped to the eight entries of the master table. In the sense that the tables for N=0, 1, 2, and 3 are nested. Although maximum $N_0$=3 (i.e., 8 entries in the master tables) is illustrated in the examples, a smaller or larger value can be used.

In an alternative embodiment, the subset of entries of the master antenna port table corresponding to N may be flexibly configured by the gNB to the UE as part of the DMRS configuration. For instance, a bitmap of size-$2^{N_0}$ may be used, wherein the bitmap has $2^N$ bits set to one and where a bit set to one indicates that the corresponding row of the master antenna port table is included in the antenna port subset. The master antenna port table can be either one of Table 13 to Table 22, in which case $N_0=3$, or one of tables 7.3.1.1.2-6 to 7.3.1.1.2-23 of 3GPP TS38.212 v15.6.0 and in which case $N_0=3$ is the size of the "antenna ports" field in DCI Format 1-1 for a given DMRS type, dmrs-Type, a maximum front-loaded symbol length, maxLength, a rank, and whether transform precoder is disabled. In a variant of this embodiment, the number of bits of the antenna port field, N, is not explicitly indicated to the UE but is implicitly indicated via the configuration bitmap. For instance, if the bitmap contains M ones, the UE determines that the antenna port field size is $N=\lceil \log_2 M \rceil$.

TABLE 13

Antenna port(s), transform precoder is enabled, dmrs-Type = 1, maxLength = 1

| Value | Number of DMRS CDM group(s) without data | DMRS port(s) | Note |
|---|---|---|---|
| 0 | 2 | 0 | 3 dB power boosting |
| 1 | 2 | 1 | 3 dB power boosting |
| 2 | 2 | 2 | 3 dB power boosting |
| 3 | 2 | 3 | 3 dB power boosting |
| 4-7 | reserved | | |

TABLE 14

Antenna port(s), transform precoder is enabled, dmrs-Type = 1, maxLength = 2

| Value | Number of DMRS CDM group(s) without data | DMRS port(s) | Number of front-load symbols | Note |
|---|---|---|---|---|
| 0 | 2 | 0 | 1 | 3 dB power boosting |
| 1 | 2 | 0 | 2 | 3 dB power boosting |
| 2 | 2 | 1 | 1 | 3 dB power boosting |
| 3 | 2 | 1 | 2 | 3 dB power boosting |
| 4 | 2 | 2 | 1 | 3 dB power boosting |
| 5 | 2 | 2 | 2 | 3 dB power boosting |
| 6 | 2 | 3 | 1 | 3 dB power boosting |
| 7 | 2 | 3 | 2 | 3 dB power boosting |

TABLE 15

Antenna port(s), transform precoder is disabled, dmrs-Type = 1, maxLength = 1, rank = 1

| Value | Number of DMRS CDM group(s) without data | DMRS port(s) | Note |
|---|---|---|---|
| 0 | 2 | 0 | 3 dB power boost |
| 1 | 1 | 0 | 0 dB power boost |
| 2 | 2 | 1 | 3 dB power boost |
| 3 | 1 | 1 | 0 dB power boost |
| 4-7 | reserved | | |

TABLE 16

Antenna port(s), transform precoder is disabled, dmrs-Type = 1, maxLength = 1, rank = 2

| Value | Number of DMRS CDM group(s) without data | DMRS port(s) | Note |
|---|---|---|---|
| 0 | 2 | 0, 1 | 3 dB power boosting |
| 1 | 1 | 0, 1 | 0 dB power boosting |
| 2 | 2 | 2, 3 | 3 dB power boosting |
| 3 | 2 | 0, 2 | 3 dB power boosting |
| 4-7 | reserved | | |

TABLE 17

Antenna port(s), transform precoder is disabled, dmrs-Type = 1, maxLength = 2, rank = 1

| Value | Number of DMRS CDM group(s) without data | DMRS port(s) | Number of front-load symbols | Note |
|---|---|---|---|---|
| 0 | 2 | 0 | 1 | 3 dB power boosting |
| 1 | 2 | 0 | 2 | 3 dB power boosting |
| 2 | 2 | 1 | 1 | 3 dB power boosting |
| 3 | 2 | 1 | 2 | 3 dB power boosting |
| 4 | 2 | 2 | 1 | 3 dB power boosting |
| 5 | 2 | 2 | 2 | 3 dB power boosting |
| 6-7 | reserved | | | |

TABLE 18

Antenna port(s), transform precoder is disabled, dmrs-Type = 1, maxLength = 2, rank = 2

| Value | Number of DMRS CDM group(s) without data | DMRS port(s) | Number of front-load symbols | Note |
|---|---|---|---|---|
| 0 | 2 | 0, 1 | 1 | 3 dB power boosting |
| 1 | 2 | 0, 1 | 2 | 3 dB power boosting |

TABLE 18-continued

Antenna port(s), transform precoder is disabled,
dmrs-Type = 1, maxLength = 2, rank = 2

| Value | Number of DMRS CDM group(s) without data | DMRS port(s) | Number of front-load symbols | Note |
|---|---|---|---|---|
| 2 | 1 | 0, 1 | 1 | No power boosting |
| 3 | 1 | 0, 1 | 2 | No power boosting |
| 4-7 | reserved | | | |

TABLE 19

Antenna port(s), transform precoder is disabled,
dmrs-Type = 2, maxLength = 1, rank = 1

| Value | Number of DMRS CDM group(s) without data | DMRS port(s) | Note |
|---|---|---|---|
| 0 | 2 | 0 | 3 dB power boost |
| 1 | 1 | 0 | 0 dB power boost |
| 2 | 2 | 1 | 3 dB power boost |
| 3 | 1 | 1 | 0 dB power boost |
| 4-7 | reserved | | |

TABLE 20

Antenna port(s), transform precoder is disabled,
dmrs-Type = 2, maxLength = 1, rank = 2

| Value | Number of DMRS CDM group(s) without data | DMRS port(s) | Note |
|---|---|---|---|
| 0 | 2 | 0, 1 | 3 dB power boosting |
| 1 | 3 | 0, 1 | 4.77 dB power boosting |
| 2 | 2 | 2, 3 | 3 dB power boosting |
| 3 | 3 | 2, 3 | 4.77 dB power boosting |
| 4-7 | reserved | | |

TABLE 21

Antenna port(s), transform precoder is disabled,
dmrs-Type = 2, maxLength = 2, rank = 1

| Value | Number of DMRS CDM group(s) without data | DMRS port(s) | Number of front-load symbols | Note |
|---|---|---|---|---|
| 0 | 3 | 0 | 1 | 4.77 dB power boosting |
| 1 | 3 | 0 | 2 | 4.77 dB power boosting |
| 2 | 2 | 0 | 1 | 3 dB power boosting |
| 3 | 2 | 0 | 2 | 3 dB power boosting |
| 4 | 3 | 1 | 1 | 4.77 dB power boosting |
| 5 | 3 | 1 | 2 | 4.77 dB power boosting |

TABLE 21-continued

Antenna port(s), transform precoder is disabled,
dmrs-Type = 2, maxLength = 2, rank = 1

| Value | Number of DMRS CDM group(s) without data | DMRS port(s) | Number of front-load symbols | Note |
|---|---|---|---|---|
| 6 | 3 | 2 | 1 | 4.77 dB power boosting |
| 7 | 3 | 2 | 2 | 4.77 dB power boosting |

TABLE 22

Antenna port(s), transform precoder is disabled,
dmrs-Type = 2, maxLength = 2, rank = 2

| Value | Number of DMRS CDM group(s) without data | DMRS port(s) | Number of front-load symbols | Note |
|---|---|---|---|---|
| 0 | 3 | 0, 1 | 1 | 4.77 dB power boosting |
| 1 | 3 | 0, 1 | 2 | 4.77 dB power boosting |
| 2 | 2 | 0, 1 | 1 | 3 dB power boosting |
| 3 | 2 | 0, 1 | 2 | 3 dB power boosting |
| 4 | 3 | 2, 3 | 1 | 4.77 dB power boosting |
| 5 | 3 | 2, 3 | 2 | 4.77 dB power boosting |
| 6 | 3 | 2, 3 | 1 | 4.77 dB power boosting |
| 7 | 3 | 2, 3 | 2 | 4.77 dB power boosting |

Figure 4:
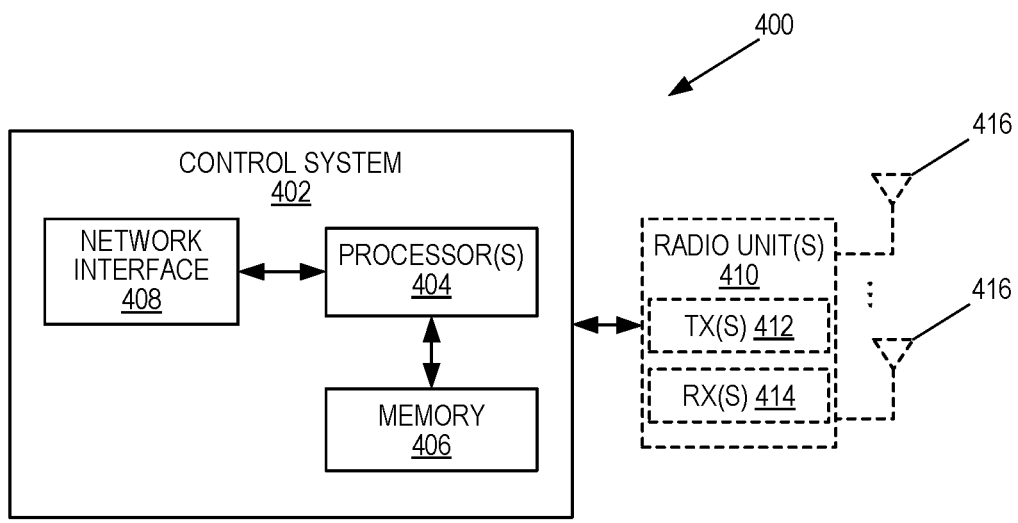
FIGS. 4 through 6 are schematic block diagrams of example embodiments of a radio access node.

FIG. 4 is a schematic block diagram of a radio access node 400 according to some embodiments of the present disclosure. Optional features are represented by dashed boxes. The radio access node 400 may be, for example, a base station 202 or 206 or a network node that implements all or part of the functionality of the base station 202 or gNB described herein. As illustrated, the radio access node 400 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, the radio access node 400 may include one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a radio access node 400 as described herein. In some embodiments, the function(s) are implemented in software that is stored, e.g., in the memory 406 and executed by the one or more processors 404.

Figure 5:
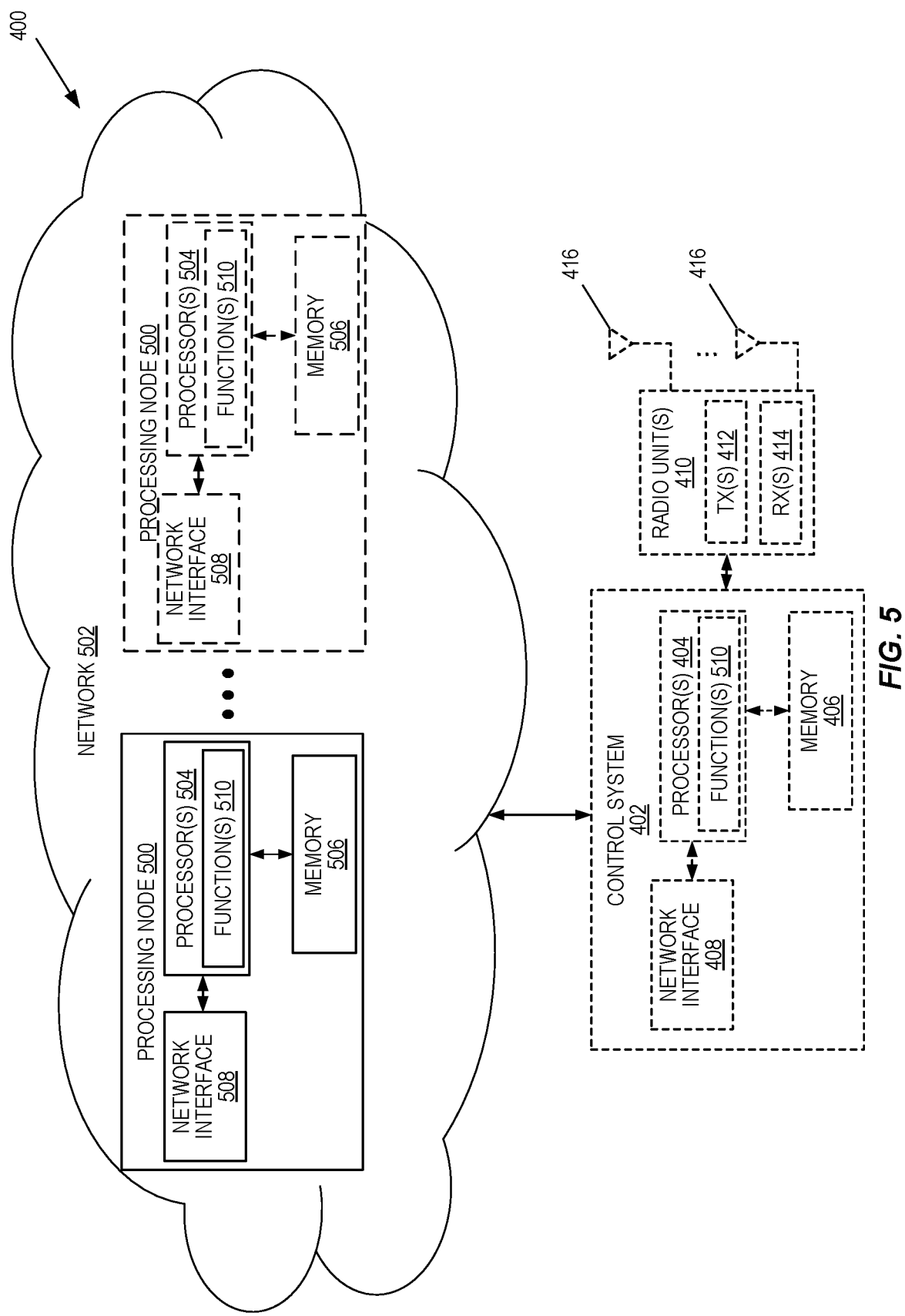

FIG. 5 is a schematic block diagram that illustrates a virtualized embodiment of the radio access node 400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 400 in which at least a portion of the functionality of the radio access node 400 is implemented as a virtual component(s) (e.g., via a virtual machine(s) executing on a physical processing node(s) in a network(s)). As illustrated, in this example, the radio access node 400 may include the control system 402 and/or the one or more radio units 410, as described above. The control system 402 may be connected to the radio unit(s) 410 via, for example, an optical cable or the like. The radio access node 400 includes one or more processing nodes 500 coupled to or included as part of a network(s) 502. If present, the control system 402 or the radio unit(s) are connected to the processing node(s) 500 via the network 502. Each processing node 500 includes one or more processors 504 (e.g., CPUs, ASICs, FPGAs, and/or the like), memory 506, and a network interface 508.

In this example, functions 510 of the radio access node 400 described herein are implemented at the one or more processing nodes 500 or distributed across the one or more processing nodes 500 and the control system 402 and/or the radio unit(s) 410 in any desired manner. In some particular embodiments, some or all of the functions 510 of the radio access node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of radio access node 400 or a node (e.g., a processing node 500) implementing one or more of the functions 510 of the radio access node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
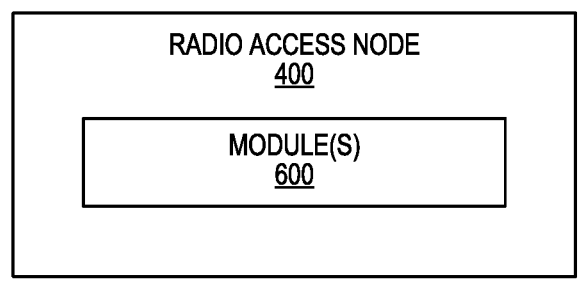

FIG. 6 is a schematic block diagram of the radio access node 400 according to some other embodiments of the present disclosure. The radio access node 400 includes one or more modules 600, each of which is implemented in software. The module(s) 600 provide the functionality of the radio access node 400 described herein. This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
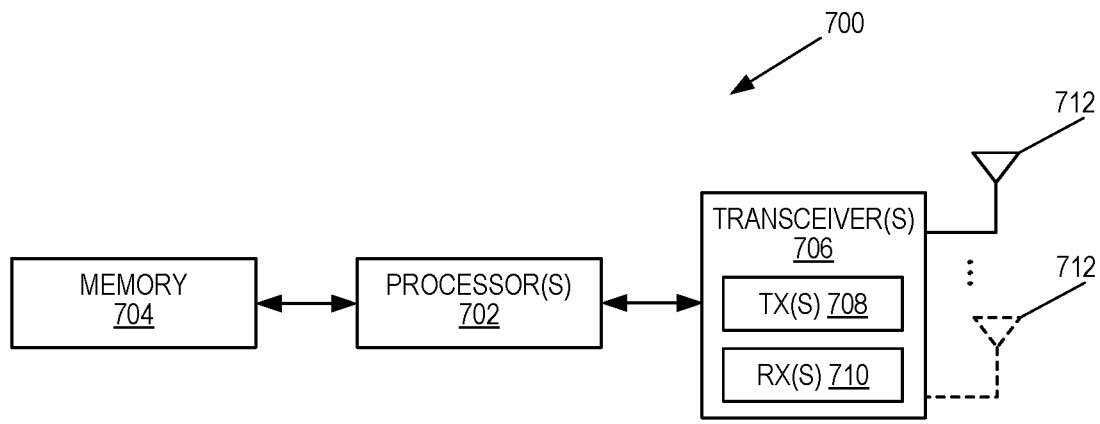
FIGS. 7 and 8 are schematic block diagrams of example embodiments of a UE.

FIG. 7 is a schematic block diagram of a wireless communication device 700 according to some embodiments of the present disclosure. As illustrated, the wireless communication device 700 includes one or more processors 702 (e.g., CPUs, ASICs, FPGAs, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the wireless communication device 700 described above may be fully or partially implemented in software that is, e.g., stored in the memory 704 and executed by the processor(s) 702. Note that the wireless communication device 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the wireless communication device 700 and/or allowing output of information from the wireless communication device 700), a power supply (e.g., a battery and associated power circuitry), etc.

In some embodiments, a computer program including instructions which, when executed by at least one processor, causes the at least one processor to carry out the functionality of the wireless communication device 700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
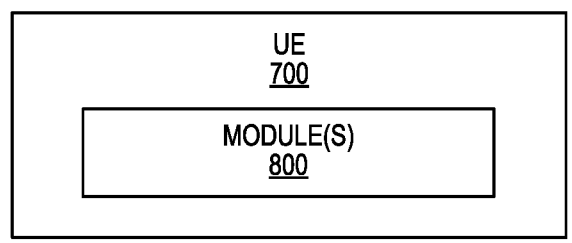

FIG. 8 is a schematic block diagram of the wireless communication device 700 according to some other embodiments of the present disclosure. The wireless communication device 700 includes one or more modules 800, each of which is implemented in software. The module(s) 800 provide the functionality of the wireless communication device 700 described herein.

Figure 9:
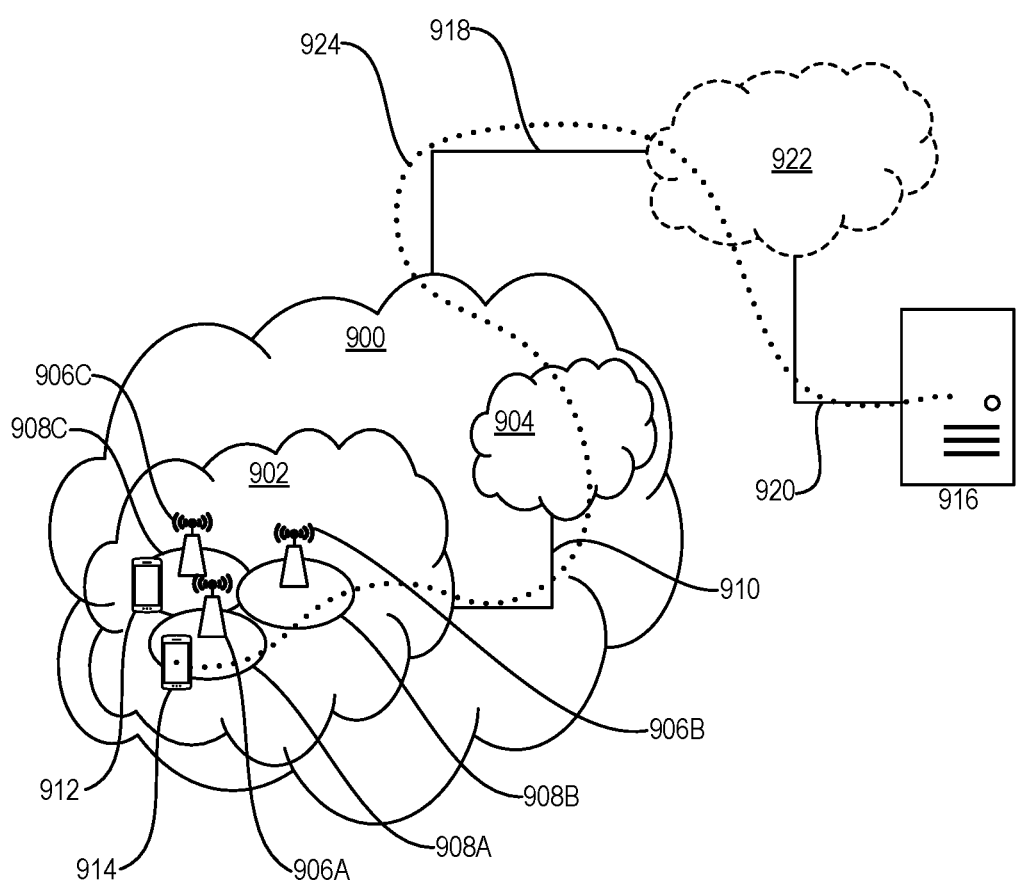
FIG. 9 illustrates an example embodiment of a communication system in which embodiments of the present disclosure may be implemented.

With reference to FIG. 9, in accordance with an embodiment, a communication system includes a telecommunication network 900, such as a 3GPP-type cellular network, which comprises an access network 902, such as a RAN, and a core network 904. The access network 902 comprises a plurality of base stations 906A, 906B, 906C, such as Node Bs, eNBs, gNBs, or other types of wireless Access Points (APs), each defining a corresponding coverage area 908A, 908B, 908C. Each base station 906A, 906B, 906C is connectable to the core network 904 over a wired or wireless connection 910. A first UE 912 located in coverage area 908C is configured to wirelessly connect to, or be paged by, the corresponding base station 906C. A second UE 914 in coverage area 908A is wirelessly connectable to the corresponding base station 906A. While a plurality of UEs 912, 914 are illustrated in this example, the disclosed embodiments are equally applicable to a situation where a sole UE is in the coverage area or where a sole UE is connecting to the corresponding base station 906.

The telecommunication network 900 is itself connected to a host computer 916, which may be embodied in the hardware and/or software of a standalone server, a cloud-implemented server, a distributed server, or as processing resources in a server farm. The host computer 916 may be under the ownership or control of a service provider, or may be operated by the service provider or on behalf of the service provider. Connections 918 and 920 between the telecommunication network 900 and the host computer 916 may extend directly from the core network 904 to the host computer 916 or may go via an optional intermediate network 922. The intermediate network 922 may be one of, or a combination of more than one of, a public, private, or hosted network; the intermediate network 922, if any, may be a backbone network or the Internet; in particular, the intermediate network 922 may comprise two or more subnetworks (not shown).

The communication system of FIG. 9 as a whole enables connectivity between the connected UEs 912, 914 and the host computer 916. The connectivity may be described as an Over-the-Top (OTT) connection 924. The host computer 916 and the connected UEs 912, 914 are configured to communicate data and/or signaling via the OTT connection 924, using the access network 902, the core network 904, any intermediate network 922, and possible further infrastructure (not shown) as intermediaries. The OTT connection 924 may be transparent in the sense that the participating communication devices through which the OTT connection 924 passes are unaware of routing of uplink and downlink communications. For example, the base station 906 may not or need not be informed about the past routing of an incoming downlink communication with data originating from the host computer 916 to be forwarded (e.g., handed over) to a connected UE 912. Similarly, the base station 906 need not be aware of the future routing of an outgoing uplink communication originating from the UE 912 towards the host computer 916.

Example implementations, in accordance with an embodiment, of the UE, base station, and host computer discussed in the preceding paragraphs will now be described with reference to FIG. 10. In a communication system 1000, a host computer 1002 comprises hardware 1004 including a communication interface 1006 configured to set up and maintain a wired or wireless connection with an interface of a different communication device of the communication system 1000. The host computer 1002 further comprises processing circuitry 1008, which may have storage and/or processing capabilities. In particular, the processing circuitry 1008 may comprise one or more programmable processors, ASICs, FPGAs, or combinations of these (not shown) adapted to execute instructions. The host computer 1002 further comprises software 1010, which is stored in or accessible by the host computer 1002 and executable by the processing circuitry 1008. The software 1010 includes a host application 1012. The host application 1012 may be operable to provide a service to a remote user, such as a UE 1014 connecting via an OTT connection 1016 terminating at the UE 1014 and the host computer 1002. In providing the service to the remote user, the host application 1012 may provide user data which is transmitted using the OTT connection 1016.

The communication system 1000 further includes a base station 1018 provided in a telecommunication system and comprising hardware 1020 enabling it to communicate with the host computer 1002 and with the UE 1014. The hardware 1020 may include a communication interface 1022 for setting up and maintaining a wired or wireless connection with an interface of a different communication device of the communication system 1000, as well as a radio interface 1024 for setting up and maintaining at least a wireless connection 1026 with the UE 1014 located in a coverage area (not shown in FIG. 10) served by the base station 1018. The communication interface 1022 may be configured to facilitate a connection 1028 to the host computer 1002. The connection 1028 may be direct or it may pass through a core network (not shown in FIG. 10) of the telecommunication system and/or through one or more intermediate networks outside the telecommunication system. In the embodiment shown, the hardware 1020 of the base station 1018 further includes processing circuitry 1030, which may comprise one or more programmable processors, ASICs, FPGAs, or combinations of these (not shown) adapted to execute instructions. The base station 1018 further has software 1032 stored internally or accessible via an external connection.

The communication system 1000 further includes the UE 1014 already referred to. The UE's 1014 hardware 1034 may include a radio interface 1036 configured to set up and maintain a wireless connection 1026 with a base station serving a coverage area in which the UE 1014 is currently located. The hardware 1034 of the UE 1014 further includes processing circuitry 1038, which may comprise one or more programmable processors, ASICs, FPGAs, or combinations of these (not shown) adapted to execute instructions. The UE 1014 further comprises software 1040, which is stored in or accessible by the UE 1014 and executable by the processing circuitry 1038. The software 1040 includes a client application 1042. The client application 1042 may be operable to provide a service to a human or non-human user via the UE 1014, with the support of the host computer 1002. In the host computer 1002, the executing host application 1012 may communicate with the executing client application 1042 via the OTT connection 1016 terminating at the UE 1014 and the host computer 1002. In providing the service to the user, the client application 1042 may receive request data from the host application 1012 and provide user data in response to the request data. The OTT connection 1016 may transfer both the request data and the user data. The client application 1042 may interact with the user to generate the user data that it provides.

Figure 10:
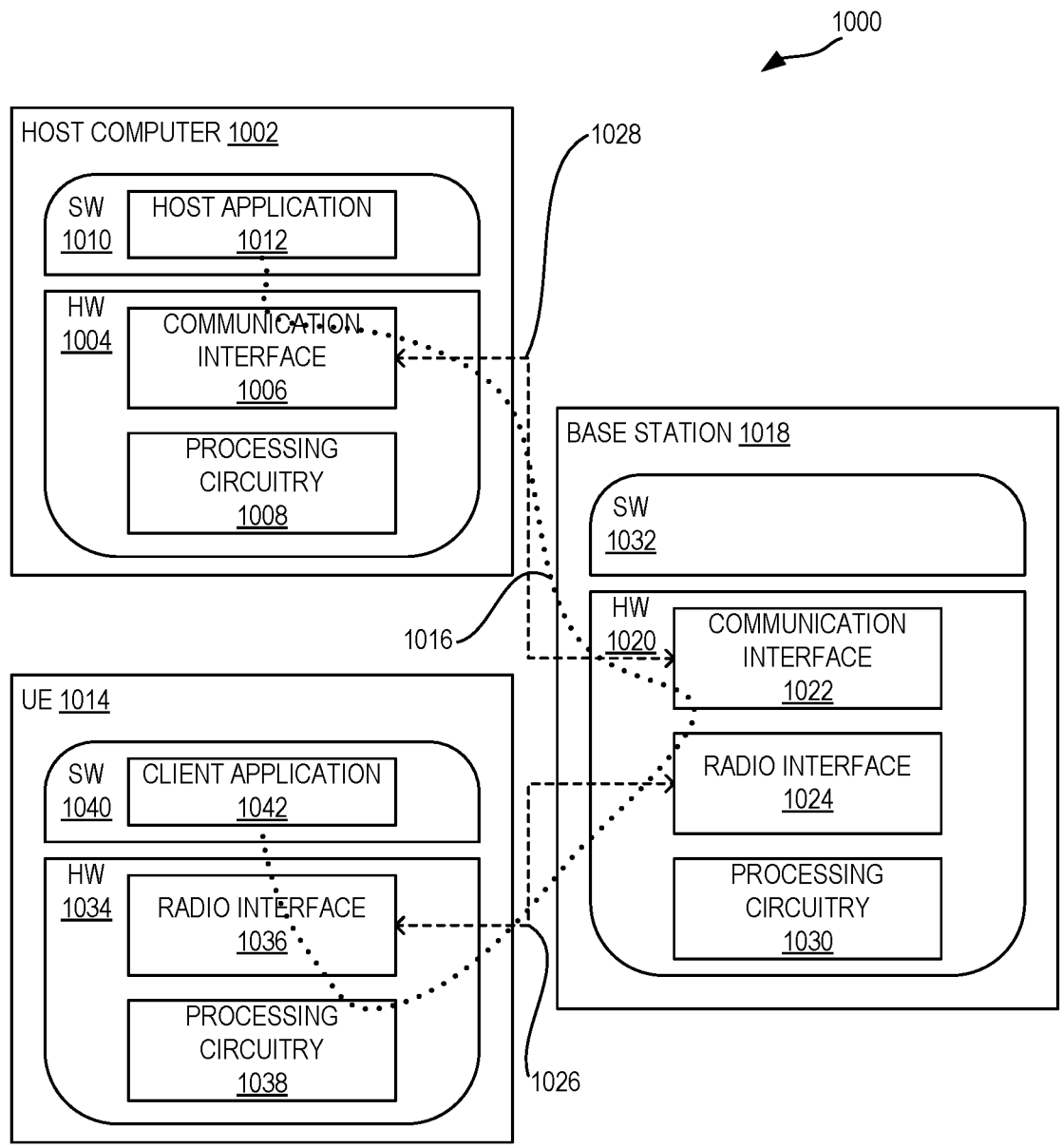
FIG. 10 illustrates example embodiments of the host computer, base station, and UE of FIG. 9.

It is noted that the host computer 1002, the base station 1018, and the UE 1014 illustrated in FIG. 10 may be similar or identical to the host computer 916, one of the base stations 906A, 906B, 906C, and one of the UEs 912, 914 of FIG. 9, respectively. This is to say, the inner workings of these entities may be as shown in FIG. 10 and independently, the surrounding network topology may be that of FIG. 9.

In FIG. 10, the OTT connection 1016 has been drawn abstractly to illustrate the communication between the host computer 1002 and the UE 1014 via the base station 1018 without explicit reference to any intermediary devices and the precise routing of messages via these devices. The network infrastructure may determine the routing, which may be configured to hide from the UE 1014 or from the service provider operating the host computer 1002, or both. While the OTT connection 1016 is active, the network infrastructure may further take decisions by which it dynamically changes the routing (e.g., on the basis of load balancing consideration or reconfiguration of the network).

The wireless connection 1026 between the UE 1014 and the base station 1018 is in accordance with the teachings of the embodiments described throughout this disclosure. One or more of the various embodiments improve the performance of OTT services provided to the UE 1014 using the OTT connection 1016, in which the wireless connection 1026 forms the last segment. More precisely, the teachings of these embodiments may improve memory consumption and processing resources and thereby provide benefits such as improved performance, decreased power consumption, and the like.

A measurement procedure may be provided for the purpose of monitoring data rate, latency, and other factors on which the one or more embodiments improve. There may further be an optional network functionality for reconfiguring the OTT connection 1016 between the host computer

1002 and the UE 1014, in response to variations in the measurement results. The measurement procedure and/or the network functionality for reconfiguring the OTT connection 1016 may be implemented in the software 1010 and the hardware 1004 of the host computer 1002 or in the software 1040 and the hardware 1034 of the UE 1014, or both. In some embodiments, sensors (not shown) may be deployed in or in association with communication devices through which the OTT connection 1016 passes; the sensors may participate in the measurement procedure by supplying values of the monitored quantities exemplified above, or supplying values of other physical quantities from which the software 1010, 1040 may compute or estimate the monitored quantities. The reconfiguring of the OTT connection 1016 may include message format, retransmission settings, preferred routing, etc.; the reconfiguring need not affect the base station 1018, and it may be unknown or imperceptible to the base station 1018. Such procedures and functionalities may be known and practiced in the art. In certain embodiments, measurements may involve proprietary UE signaling facilitating the host computer 1002's measurements of throughput, propagation times, latency, and the like. The measurements may be implemented in that the software 1010 and 1040 causes messages to be transmitted, in particular empty or 'dummy' messages, using the OTT connection 1016 while it monitors propagation times, errors, etc.

FIG. 11 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 11 will be included in this section. In step 1100, the host computer provides user data. In sub-step 1102 (which may be optional) of step 1100, the host computer provides the user data by executing a host application. In step 1104, the host computer initiates a transmission carrying the user data to the UE. In step 1106 (which may be optional), the base station transmits to the UE the user data which was carried in the transmission that the host computer initiated, in accordance with the teachings of the embodiments described throughout this disclosure. In step 1108 (which may also be optional), the UE executes a client application associated with the host application executed by the host computer.

FIG. 12 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 12 will be included in this section. In step 1200 of the method, the host computer provides user data. In an optional sub-step (not shown) the host computer provides the user data by executing a host application. In step 1202, the host computer initiates a transmission carrying the user data to the UE. The transmission may pass via the base station, in accordance with the teachings of the embodiments described throughout this disclosure. In step 1204 (which may be optional), the UE receives the user data carried in the transmission.

Figures 13, 14:
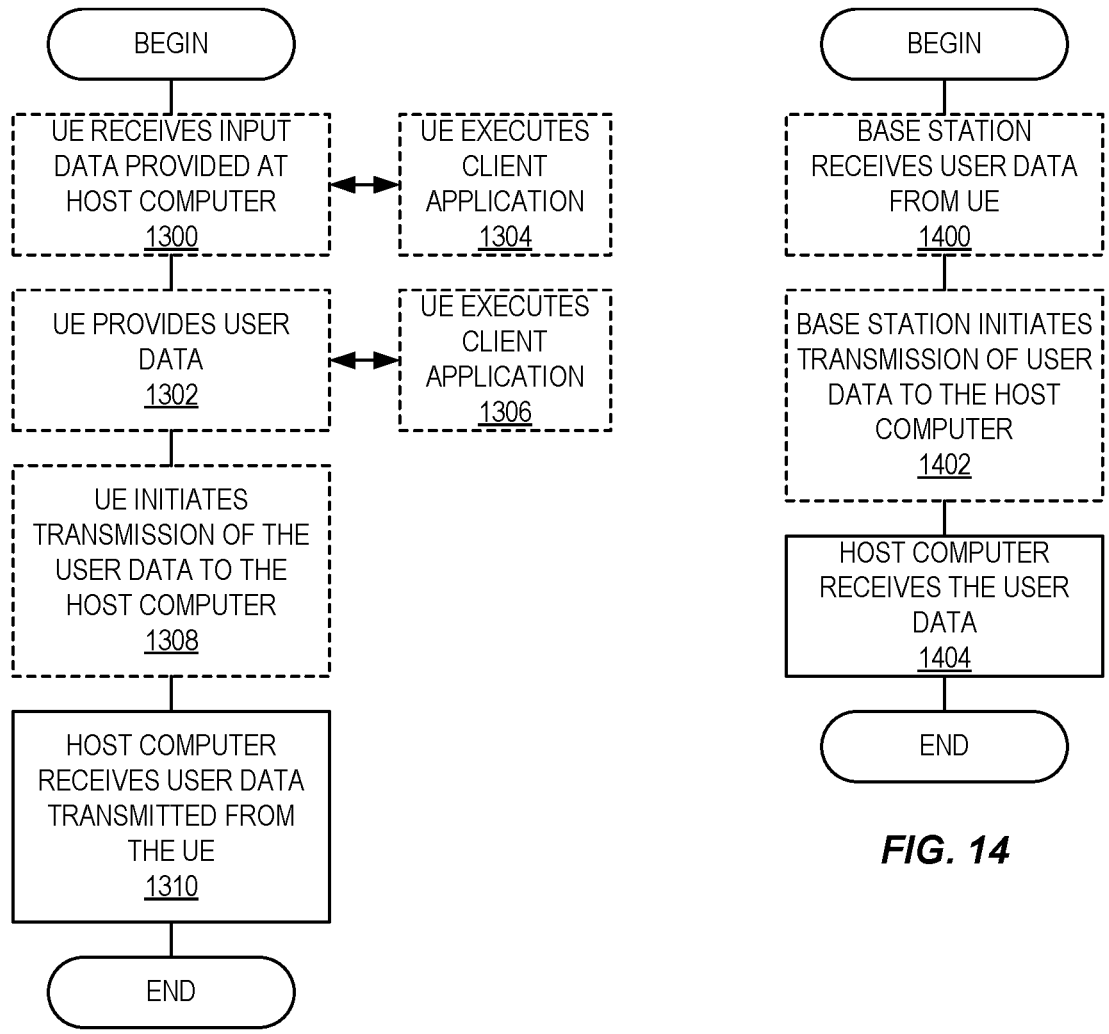

FIG. 13 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 13 will be included in this section. In step 1300 (which may be optional), the UE receives input data provided by the host computer. Additionally or alternatively, in step 1302, the UE provides user data. In sub-step 1304 (which may be optional) of step 1300, the UE provides the user data by executing a client application. In sub-step 1306 (which may be optional) of step 1302, the UE executes a client application which provides the user data in reaction to the received input data provided by the host computer. In providing the user data, the executed client application may further consider user input received from the user. Regardless of the specific manner in which the user data was provided, the UE initiates, in sub-step 1308 (which may be optional), transmission of the user data to the host computer. In step 1310 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 14 will be included in this section. In step 1400 (which may be optional), in accordance with the teachings of the embodiments described throughout this disclosure, the base station receives user data from the UE. In step 1402 (which may be optional), the base station initiates transmission of the received user data to the host computer. In step 1404 (which may be optional), the host computer receives the user data carried in the transmission initiated by the base station.

Figure 15:
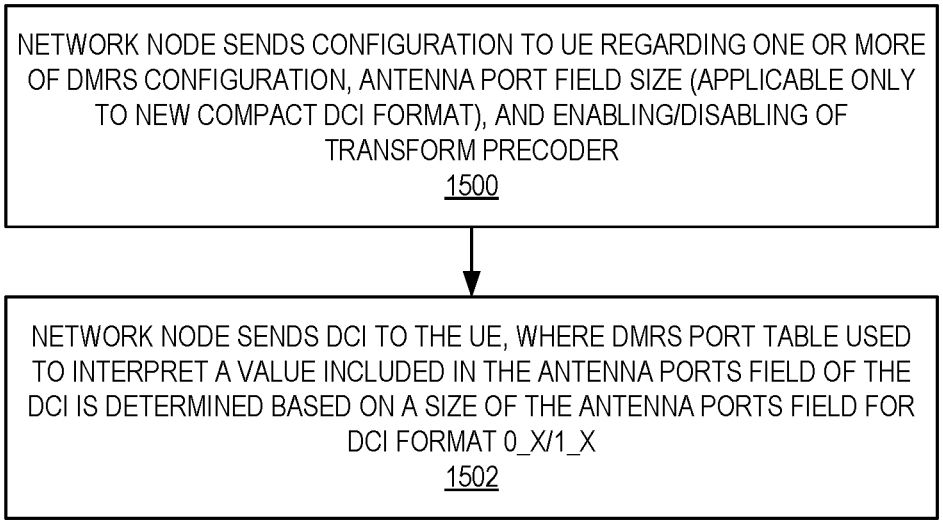
FIG. 15 is a flow chart that illustrates the operation of a network node in accordance with embodiments of the present disclosure.

FIG. 15 is a flow chart that illustrates the operation of a network node (e.g., base station 202) in accordance with at least some aspects of the embodiments described above. As illustrated, in step 1500, the network node sends a configuration to a UE 212. As discussed above, the configuration may be regarding one or more of the following:

- a DMRS configuration which may comprise an indication of the type of DMRS used (i.e., whether type1 DMRS or type2 DMRS is used) and the maximum number of front-loaded DMRS symbols (i.e., whether maxLength=1 or maxLength=2);
- a configuration parameter indicating the antenna port field size (i.e., the number of bits in the antenna port field) which is applicable only to the new UL/DL DCI formats; and
- a configuration for enabling/disabling transform precoder in the case of UL.

In step 1502, the network node sends DCI to the UE 212 via PDCCH. The DCI is in a particular DCI format (e.g., DCI format 0_1/0_1 or DCI format 0_X/1_X). The DMRS table to be used to interpret the value in the antenna ports field of the DCI is determined as described above. Note that the relationship between the DMRS table used to interpret the value in the antenna ports field and the size, or bit-width, of the antenna ports field may be any of those described above.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device for determining an antenna port, the method comprising one or more of: receiving a configuration from a network node; receiving control information from the network node, the control information comprising an antenna port field; detecting a format of the control information, wherein the format of the control information is associated with an antenna port field size; identifying a table to be used for determining the antenna port based on the configuration and the antenna port field size; and determining the antenna port based on the table and the value of the antenna port field.

Embodiment 2: The method of the previous embodiment wherein one or more of: the configuration comprises a demodulation reference signal, DMRS, configuration; the control information comprises downlink control information, DCI; and the table is a DMRS antenna port table.

Embodiment 3: The method of any of the previous embodiments wherein identifying the table to be used for determining the antenna port comprises identifying a subset of a master table to be used for determining the antenna port.

Embodiment 4: The method of any of the previous embodiments further comprising receiving a table indicator from the network node, wherein, optionally, identifying the table is based on the table indicator.

Embodiment 5: The method of any of the previous embodiments wherein the table indicator is a bitmap and, optionally, set bits in the bitmap indicate that a corresponding row in the master table is included in the subset of the table.

Embodiment 6: The method of any of the previous embodiments wherein the configuration further comprises an enabling or disabling of a transform precoder.

Embodiment 7: The method of any of the previous embodiments wherein the configuration further comprises a rank of uplink transmission.

Embodiment 8: The method of embodiment 7 wherein identifying the table to be used is further based on one or more of the enabling or disabling of the transform precoder and the rank of uplink transmission.

Embodiment 9: A method for antenna port indication in a wireless network comprising at least a network node and a user equipment, UE, the method comprising one or more of: specifying a master antenna port table for each Demodulation Reference Signal, DMRS, configuration and in case of uplink, together with a transform precoder configuration and a rank configuration; receiving by the UE a DMRS configuration and in case of uplink, a transform precoder configuration and a rank configuration, and a configuration of an antenna port field size in a Downlink Control Information, DCI with a certain format; indicating to the UE in an antenna port field in a DCI with the format one or multiple DMRS port for a Physical Downlink Shared Channel, PDSCH, or a Physical Uplink Shared Channel, PUSCH, scheduled by the DCI; determining by the UE an antenna port table based on the master antenna table associated with the DMRS configuration and in case of uplink, the transform precoder configuration and the rank configuration; determining by the UE the one or multiple DMRS port based on the antenna port field in the DCI and the determined antenna port table.

Embodiment 10: The method of the previous embodiment wherein the master antenna port table is of size $2^{N_0}$ and comprises a set of nested antenna tables of size $<=2^{N_0}$, whereas the first $2^N$ entries of the master antenna table forms an antenna port table associated with an antenna port field size of N bits.

Embodiment 11: The method of any of the previous embodiments wherein the master antenna port table is an existing antenna port table of size $2^{N_0}$.

Embodiment 12: The method of any of the previous embodiments wherein the configuration of an antenna port field size of N bits comprises a configuration of an integer N.

Embodiment 13: The method of any of the previous embodiments wherein the configuration of an antenna port field size of N bits comprises configuring a bit map of $2^{N_0}$ bits with the least significant bit associated with the first row and/or the most significant bit associated with the last row of the master antenna port table, whereas a row in the master table is selected if the corresponding bit in the bitmap is set to 1.

Embodiment 14: The method of any of the previous embodiments wherein the number of set bits in the bit map is determined by the configured size of the antenna port field of the DCI.

Embodiment 15: The method of any of the previous embodiments wherein the size for an antenna port field is determined by the number of set bits in the bit map.

Embodiment 16: The method of any of the previous embodiments wherein the determining by the UE an antenna port table of size $2^N$ comprises constructing the antenna port table with the first $2^N$ rows of the master antenna port table.

Embodiment 17: The method of any of the previous embodiments wherein the determining by the UE an antenna port table of size $2^N$ comprises constructing the antenna port table with the $2^N$ rows of the master antenna port table determined by the bitmap.

Embodiment 18: The method of any of the previous embodiments wherein the determining by the UE the one or multiple DMRS port comprises looking up the determined antenna port table using the codepoint of the antenna port field in the received DCI to identify a row and the corresponding DMRS port(s).

Embodiment 19: The method of any of the previous embodiments wherein the DCI has a new DCI format.

Embodiment 20: A method for determining DMRS antenna ports at a UE the method comprising one or more of:
　　receiving, at the UE from a gNB higher layer configuration of one or more of DMRS configuration, an antenna port field size, enabling/disabling of transform precoder, detecting, by the UE, a DCI format while receiving DCI via PDCCH from the gNB;

in response to detecting a DCI format with dedicated higher layer configuration for antenna port field size, using the higher layer configuration for antenna port field size jointly with one or more of the following to determined one of multiple predefined DMRS tables or a subset of a large predefined DMRS table:

DMRS configuration;

enabling/disabling of transform precoder;

transmission rank; and receiving indication from the gNB of the DMRS antenna ports based on a value indicated by the antenna port field in DCI that corresponds to one of the rows in the determined DMRS table or the determined subset of a large DMRS table.

Embodiment 21: The method of any of the previous embodiments, further comprising: providing user data; and forwarding the user data to a host computer via the transmission to the base station.

Group B Embodiments

Embodiment 22: A method performed by a network node for facilitating the determination of a demodulation reference signal, DMRS, antenna port, the method comprising one or more of: providing a configuration to a wireless device, the configuration comprising a DMRS configuration and a DMRS table indicator, wherein the DMRS table indicator indicates a DMRS table that the wireless device should use to determine the DMRS antenna port; and providing downlink control information, DCI, to the wireless device, the DCI comprising an antenna port field, which is used along with the DMRS table indicator by the wireless device to choose the DMRS antenna port.

Embodiment 23: The method of the previous embodiment wherein the DMRS table indicator identifies a subset of a DMRS table to be used by the wireless device to determine the DMRS antenna port.

Embodiment 24: The method of any of the previous embodiments wherein the DMRS table indicator is a bitmap and set bits in the bitmap indicate that a corresponding row in the DMRS table is included in the subset of the DMRS table.

Embodiment 25: The method of any of the previous embodiments, further comprising: obtaining user data; and forwarding the user data to a host computer or a wireless device.

Group C Embodiments

Embodiment 26: A wireless device for determining a demodulation reference signal, DMRS, antenna port, the wireless device comprising: processing circuitry configured to perform any of the steps of any of the Group A embodiments; and power supply circuitry configured to supply power to the wireless device.

Embodiment 27: A base station for determining a demodulation reference signal, DMRS, antenna port, the base station comprising: processing circuitry configured to perform any of the steps of any of the Group B embodiments; and power supply circuitry configured to supply power to the base station.

Embodiment 28: A User Equipment, UE, for determining a demodulation reference signal, DMRS, antenna port, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 29: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 30: The communication system of the previous embodiment further including the base station.

Embodiment 31: The communication system of the previous 2 embodiments, further including the UE, wherein the UE is configured to communicate with the base station.

Embodiment 32: The communication system of the previous 3 embodiments, wherein: the processing circuitry of the host computer is configured to execute a host application, thereby providing the user data; and the UE comprises processing circuitry configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 34: The method of the previous embodiment, further comprising, at the base station, transmitting the user data.

Embodiment 35: The method of the previous 2 embodiments, wherein the user data is provided at the host computer by executing a host application, the method further comprising, at the UE, executing a client application associated with the host application.

Embodiment 36: A User Equipment, UE, configured to communicate with a base station, the UE comprising a radio interface and processing circuitry configured to perform the method of the previous 3 embodiments.

Embodiment 37: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 38: The communication system of the previous embodiment, wherein the cellular network further includes a base station configured to communicate with the UE.

Embodiment 39: The communication system of the previous 2 embodiments, wherein: the processing circuitry of the host computer is configured to execute a host application, thereby providing the user data; and the UE's processing circuitry is configured to execute a client application associated with the host application.

Embodiment 40: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 41: The method of the previous embodiment, further comprising at the UE, receiving the user data from the base station.

Embodiment 42: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 43: The communication system of the previous embodiment, further including the UE.

Embodiment 44: The communication system of the previous 2 embodiments, further including the base station, wherein the base station comprises a radio interface configured to communicate with the UE and a communication interface configured to forward to the host computer the user data carried by a transmission from the UE to the base station.

Embodiment 45: The communication system of the previous 3 embodiments, wherein: the processing circuitry of the host computer is configured to execute a host application; and the UE's processing circuitry is configured to execute a client application associated with the host application, thereby providing the user data.

Embodiment 46: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 47: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 48: The method of the previous embodiment, further comprising, at the UE, providing the user data to the base station.

Embodiment 49: The method of the previous 2 embodiments, further comprising: at the UE, executing a client application, thereby providing the user data to be transmitted; and at the host computer, executing a host application associated with the client application.

Embodiment 50: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 51: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 52: The communication system of the previous embodiment further including the base station.

Embodiment 53: The communication system of the previous 2 embodiments, further including the UE, wherein the UE is configured to communicate with the base station.

Embodiment 54: The communication system of the previous 3 embodiments, wherein: the processing circuitry of the host computer is configured to execute a host application; and the UE is configured to execute a client application associated with the host application, thereby providing the user data to be received by the host computer.

Embodiment 55: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 56: The method of the previous embodiment, further comprising at the base station, receiving the user data from the UE.

Embodiment 57: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

What is claimed is:

1. A method performed by a wireless communication device for a cellular communications system, the method comprising:
    receiving a configuration from a network node, the configuration comprising a demodulation reference signal, DMRS, configuration that comprises an indication of a type of DMRS used and a maximum number of front-loaded DMRS symbols, and an antenna port field configuration indicating a size of an antenna port field having a configurable size in a downlink control information, DCI, format;
    receiving a DCI of the DCI format from the network node for a corresponding physical channel, the received DCI comprising an antenna port field;
    determining the size of the antenna port field of the received DCI;
    determining a DMRS port table for interpreting a value comprised in the antenna port field of the received DCI based on at least the DMRS configuration and the size of the antenna port field, the determined DMRS port table being a subset of a master DMRS port table; and
    determining one or more DMRS ports in the DMRS table used for the corresponding physical channel based on the value of the antenna port field that corresponds to an entry in the identified DMRS table.

2. The method of claim 1 wherein:
    the master DMRS port table is of size $2^{N_0}$;
    the determined DMRS table is a subset of the master DMRS port table and is of a size $2^{N_0}$, where N is the size of the antenna port field comprised in the received DCI and N is equal to or less than $N_0$; and
the first $2^{N_0}$ entries of the master DMRS table form the determined DMRS port table.

3. The method of claim 1 wherein the size of the antenna port field is 0.

4. The method of claim 1 wherein, when the size of the antenna port field is 0, the one or more DMRS ports is determined by the first entry of the determined DMRS table.

5. The method of claim 1 wherein the size of the antenna port field is $N_0$ where the master DMRS port table is of size $2^{N_0}$.

6. The method of claim 1 wherein the master DMRS port table is an existing DMRS port table of size $2^{N_0}$.

7. The method of claim 1 wherein the configuration further comprises a configuration for enabling or disabling of a transform precoder, and determining the DMRS port table for interpreting the value comprised in the antenna port field of the received DCI is further based on the configuration for enabling or disabling of the transform precoder.

8. The method of claim 1 wherein the corresponding physical channel is a physical uplink channel, the configuration further comprises a rank of uplink channel, and determining the DMRS port table for interpreting the value comprised in the antenna port field of the received DCI is further based on the rank of uplink channel.

9. The method of claim 1 wherein the corresponding physical channel is a physical downlink shared channel.

10. The method of claim 1 wherein the corresponding physical channel is a physical uplink channel.

11. The method of claim 1 wherein whether both single front-loaded DMRS symbols and two front-loaded DMRS symbols are supported in the determined DMRS port table or whether only single front-loaded DMRS symbol is supported in the determined DMRS table depends on the size of the antenna ports field comprised in the DCI.

12. The method of claim 1 wherein whether one code division multiplexing, CDM, group without data for DMRS or more than one CDM group without data is supported for DMRS in the determined DMRS port table depends on the size of the antenna ports field comprised in the DCI.

13. A wireless communication device for a cellular communications system, the wireless communication device comprising:
one or more transmitters;
one or more receivers; and
processing circuitry associated with the one or more transmitters and the one or more receivers, the processing circuitry configured to cause the wireless communication device to:
receive a configuration from a network node, the configuration comprising a demodulation reference signal, DMRS, configuration that comprises an indication of a type of DMRS used and a maximum number of front-loaded DMRS symbols, and an antenna port field configuration indicating a size of an antenna port field having a configurable size in a downlink control information, DCI, format;
receive a DCI of the DCI format from the network node for a corresponding physical channel, the received DCI comprising an antenna port field;
determine the size of the antenna port field of the received DCI;
determine a DMRS port table for interpreting a value comprised in the antenna port field of the received DCI based on at least the DMRS configuration and the size of the antenna port field, the determined DMRS port table being a subset of a master DMRS port table; and
determine one or more DMRS ports in the DMRS table used for the corresponding physical channel based on the value of the antenna port field that corresponds to an entry in the identified DMRS table.

14. A method performed by a network node for facilitating determination of demodulation reference signal, DMRS, antenna ports, the method comprising:
sending a configuration to a wireless communication device, the configuration comprising a demodulation reference signal, DMRS, configuration that comprises an indication of a type of DMRS used and a maximum number of front-loaded DMRS symbols, and an antenna port field configuration indicating a size of an antenna port field having a configurable size in a downlink control information, DCI, format; and
sending a DCI of the DCI format to the wireless communication device, wherein:
the DCI comprises an antenna port field with a size determined by one or more of the DMRS configuration and the antenna port field size configuration;
the antenna port field indicates one or more DMRS ports in a DMRS table used for a corresponding physical channel; and
the one or more DMRS ports in the DMRS table are determined based on a value of the antenna port field that corresponds to an entry in the DMRS table, wherein the DMRS table is determined based on at least the DMRS configuration and the size of the antenna port field and the DMRS table is a subset of a master DMRS port table.

15. The method of claim 14 wherein:
the master DMRS port table is of size $2^{N_0}$;
the DMRS table is a subset of the master DMRS port table and is of a size $2^{N_0}$, where N is the size of the antenna port field comprised in the received DCI and N is equal to or less than $N_0$; and
the first $2^{N_0}$ entries of the master DMRS table form the DMRS port table.

16. The method of claim 14 wherein the size of the antenna port field is 0.

17. The method of claim 14 wherein the size of the antenna port field is No where the master DMRS port table is of size $2^{N_0}$.

18. The method of claim 14 wherein the master DMRS port table is an existing DMRS port table of size $2^{N_0}$.

19. The method of claim 14 wherein the configuration further comprises a configuration for enabling or disabling of a transform precoder, and the DMRS port table for interpreting the value comprised in the antenna port field of the received DCI is further determined based on the configuration for enabling or disabling of the transform precoder.

20. The method of claim 14 wherein the corresponding physical channel is a physical uplink channel, the configuration further comprises a rank of uplink channel, and the DMRS port table for interpreting the value comprised in the antenna port field of the received DCI is further determined based on the rank of uplink channel.

21. The method of claim 14 wherein the corresponding physical channel is a physical downlink shared channel.

22. The method of claim 14 wherein the corresponding physical channel is a physical uplink channel.

23. The method of claim 14 wherein whether both single front-loaded DMRS symbols and two front-loaded DMRS symbols are supported in the DMRS port table or whether only single front-loaded DMRS symbol is supported in the DMRS table depends on the size of the antenna ports field comprised in the DCI.

24. The method of claim 14 wherein whether one code division multiplexing, CDM, group without data for DMRS or more than one CDM group without data is supported for DMRS in the determined DMRS port table depends on the size of the antenna ports field comprised in the DCI.

25. A network node for facilitating determination of demodulation reference signal, DMRS, antenna ports, the network node comprising processing circuitry configured to cause the network node to:
  send a configuration to a wireless communication device, the configuration comprising a demodulation reference signal, DMRS, configuration that comprises an indication of a type of DMRS used and a maximum number of front-loaded DMRS symbols, and an antenna port field configuration indicating a size of an antenna port field having a variable size in a downlink control information, DCI, format; and
  send a downlink control information, DCI, of the DCI format to the wireless communication device (212), wherein:
    the DCI comprises an antenna port field with a size determined by one or more of the DMRS configuration and the antenna port field size configuration;
    the antenna port field indicates one or more DMRS ports in a DMRS table used for a corresponding physical channel; and
    the one or more DMRS ports in the DMRS table are determined based on a value of the antenna port field that corresponds to an entry in the DMRS table, wherein the DMRS table is determined based on at least the DMRS configuration and the size of the antenna port field and the DMRS table is a subset of a master DMRS port table.

* * * * *